(12) United States Patent
Tsuchimoto et al.

(10) Patent No.: US 6,430,064 B1
(45) Date of Patent: Aug. 6, 2002

(54) NON-CONTACT POWER SUPPLY DEVICE

(75) Inventors: Ryouichi Tsuchimoto; Eiji Kondou; Masuo Osumi, all of Kasugai; Hiroshi Takeuchi, Nagano; Hirokazu Ishizaka, Nagano; Takashi Hasegawa, Nagano, all of (JP)

(73) Assignee: Aichi Electric Co. Ltd., Aichi (JP)

( * ) Notice: Subject to any disclaimer, the term of this patent is extended or adjusted under 35 U.S.C. 154(b) by 0 days.

(21) Appl. No.: 09/960,812

(22) Filed: Sep. 21, 2001

(30) Foreign Application Priority Data

Jun. 29, 2001 (JP) ..................... 2001-197666
Aug. 20, 2001 (JP) ..................... 2001-248578

(51) Int. Cl.⁷ .......................................... H02M 3/335
(52) U.S. Cl. ............................ 363/24; 363/22; 363/97
(58) Field of Search .............................. 363/22, 23, 24, 363/97, 131, 56

(56) References Cited

U.S. PATENT DOCUMENTS 5,428,521 A * 6/1995 Kigawa et al. ............... 363/22
5,898,579 A * 4/1999 Boys et al. .................... 363/23
5,917,712 A * 6/1999 Okura et al. .................. 363/19
5,923,544 A * 7/1999 Urano .......................... 363/22
5,991,170 A * 11/1999 Nagai et al. .................. 363/20
6,252,386 B1 * 6/2001 Minami et al. .............. 323/355

FOREIGN PATENT DOCUMENTS

| JP | 3-98432 | 4/1991 |
| JP | 4-156242 | 5/1992 |
| JP | 2803943 | 7/1998 |
| JP | 2001-110658 | 4/2001 |

* cited by examiner

*Primary Examiner*—Bao Vu
(74) *Attorney, Agent, or Firm*—Muramatsu & Associates

(57) ABSTRACT

A non-contact power supply device having a primary unit and a secondary unit of a coupling transformer for driving a load such as decoration lamps. The primary unit is installed inside of premises and the secondary unit is installed outside of the premises and the decoration lamps are connected to the secondary unit. The primary unit and the secondary unit are attached to an intervening body such as a window or a wall in a face-to-face fashion. The non-contact power supply device is able to control and change an output voltage of the secondary unit and lighting patters of the decoration lamps solely from the inside of the premises without need for a user to go outside.

25 Claims, 13 Drawing Sheets

Q11,Q14 ON
Q12,Q13 ON

NON-CONTACT POWER SUPPLY DEVICE

FIELD OF THE INVENTION

This invention relates to a non-contact power supply device separately comprising a secondary unit from a primary unit of a coupling transformer for driving a load such as decoration lamps, and more particularly, to a non-contact power supply device which is able to control and change an output voltage of the secondary unit and the load solely from the inside of the premises without need for a user to go outside.

BACKGROUND OF THE INVENTION

There exists a non-contact power supply device capable of separately forming a secondary unit and a primary unit of a coupling transformer. Typically, such a non-contact power supply device is used for driving electric decoration lamps, electric message boards, sign boards, and the like (hereafter "electric decoration" or "load"). A non-contact power supply device, the primary unit is provided inside of a house or building (premises) while the secondary unit is provided at outside. A power plug of the primary unit is plugged into a power socket of an indoor commercial power supply, while the secondary unit is provided outdoor.

Then, both the primary and secondary units of the transformer are arranged to face each other through, for example, a glass window or a wall in between to supply electric power from the inside to the outside, thereby providing electric power to an outside load connected to the secondary unit outside. Thus, in the non-contact power supply device, the indoor commercial power supply can be use for the outdoor load while separating the indoor from the outdoor without needs of opening the door or window.

In the conventional technology, for example, when electric decoration such as decoration lamps (loads) are connected to the secondary unit, a control circuit will be required to change the lighting patterns of the decoration lamps. Thus, such a control circuit is established in the secondary unit connected to the decoration lamps.

However, in the case where the control circuit for changing the lighting patterns of the decoration lamps is provided to the secondary unit, an operation switch for the control circuit also has to be established on the secondary unit. Consequently, the user has to go outside to handle the operation switch, which is inconvenient. In other words, the non-contact power supply device, although being able to use the indoor commercial power supply for the decoration lamps while keeping the premises closed, it involves a problem where the user has to go outside to change the lighting patterns. It is especially troublesome and inconvenient in the winter season, when the non-contact power supply device is used as a power supply for the decoration lights on a Christmas tree.

Further, in the conventional non-contact power supply device, when only a small amount of current (or no current) flows through the secondary unit such as when the load connected thereto is small (or no load), there arises a problem that an output voltage will increase to exceed the allowable level. More specifically, if the load connected to the secondary unit is small such as the control circuit noted above, an excessive voltage will be produced in the secondary unit, which may cause damages in the load.

SUMMARY OF THE INVENTION

Therefore, the present invention is made to solve the problems associated with the non-contact power supply device in the conventional technology mentioned above.

It is an object of the present invention to provide a non-contact power supply device which is capable of controlling an object (load) connected to a secondary unit of a coupling transformer from a primary unit of the coupling transformer without needs for a user to go outside of premises.

It is another object of the present invention to provide a non-contact power supply device which is capable of preventing an output voltage of the secondary unit from becoming excessively large by automatically controlling the output voltage in response to changes in the load connected to the secondary unit.

It is a further object of the present invention to provide a non-contact power supply device which is capable of producing an alternating current (AC) power at outside of the premises which is identical to the commercial AC power supply available inside of the premises.

In one aspect of the present invention, the non-contact power supply device includes a primary unit and a secondary unit of a coupling transformer which are separated from one another in use and transfers electric power from the primary unit to the secondary unit through electromagnetic induction in a non-contact fashion.

In the non-contact power supply device, the secondary unit of the coupling transformer includes a second rectifying smoothing circuit for rectifying and smoothing a high frequency alternating current flowing through a secondary winding based on a high frequency alternating current flowing through a primary winding of the primary unit in order to produce a DC (direct current) output voltage, a voltage hold circuit for maintaining the DC output voltage from the second rectifying smoothing circuit for a predetermined time length, a constant voltage output circuit for producing a stabilized constant voltage based on the DC output voltage from the voltage hold circuit, a control circuit provided with the constant voltage from the constant voltage output circuit for controlling an operation of a load, and a drive signal generation circuit for supplying a drive signal to the control circuit when the output voltage from the second rectifying smoothing circuit becomes smaller than a predetermined voltage.

In the non-contact power supply device, the primary unit of the coupling transformer includes an operation circuit for either stopping the high frequency alternating current flowing through the primary winding or changing the frequency of the high frequency alternating current flowing through the primary winding to decrease the output voltage of the second rectifying smoothing circuit smaller than the predetermined voltage for generating the drive signal by the drive signal generation circuit.

According to the non-contact power supply device of the present invention, the high frequency alternating current flows through the secondary winding of the secondary unit in response to the high frequency alternating current flowing through the primary winding of the primary unit.

The alternating current flowing in the secondary winding is rectified and smoothed by the second rectifying smoothing circuit, and is output as a DC voltage from the second rectifying smoothing circuit.

The output voltage of the second rectifying smoothing circuit is maintained by the voltage hold circuit. Based on the output voltage from the voltage hold circuit, a constant voltage is produced by the constant voltage output circuit. The constant voltage is provided to the control circuit as a power source.

When the alternating current flowing in the primary winding is stopped or its frequency is changed by the operation circuit in the primary unit, the output voltage from the second rectifying smoothing circuit of the secondary unit becomes smaller than the predetermined voltage. As a result, a drive signal is generated from the drive signal output circuit which is provided to the control circuit, thereby changing the load such as lighting patterns of the decoration lamps.

Consequently, a signal for controlling the load can be output to the control circuit in the secondary unit by the operation circuit in the primary unit in the coupling transformer. In other words, the control circuit in the secondary unit can be operated from the primary unit within the premises. Thus, the user can handle the object (load) connected to the secondary unit from the primary unit without needs to go outside of the premises. This is especially useful in the cold season or under bad weather condition.

Further, in the non-contact power supply device, the load is a set of decoration lamps and the control circuit stores a plurality of lighting patterns for the decoration lamps in a memory and changes the lighting patterns in response to the drive signal from the drive signal generation circuit. Accordingly, the lighting patterns of the decoration light connected to the secondary unit can be operated and switched from the primary unit.

Further, in the non-contact power supply device, the primary unit of the coupling transformer is comprised of a first rectifying smoothing circuit for producing a direct current by rectifying and smoothing an alternating current (AC) power source, and a drive circuit which oscillates for converting a direct current from the first rectifying smoothing circuit to the high frequency alternating current so that the high frequency alternating current flows through the primary winding.

In this arrangement, the operation circuit stops the oscillation or changes the oscillation frequency in the drive circuit so as to stop the oscillation or to change the oscillation frequency of the high frequency alternating current flowing through the primary winding, thereby changing the output voltage of the second rectifying smoothing circuit in the secondary unit of the coupling transformer smaller than the predetermined voltage.

According to this non-contact power supply device, the alternating current input to the primary unit is once rectified and smoothed by the first rectifying smoothing circuit and converted into a direct current. The direct current is then converted to a high frequency alternating current by the drive circuit which flows through the primary winding. By electromagnetic induction of the high frequency alternating current flowing through the primary winding, an alternating current flows through the secondary winding of the secondary unit. Accordingly, a DC voltage is generated from the second rectifying smoothing circuit based on the alternating current in the secondary unit.

Thus, by the operation circuit, where the oscillation by the drive circuit is stopped or its oscillation frequency changed, the alternating current flowing in the primary winding is also stopped or its frequency changed. This makes the output voltage of the second rectifying smoothing circuit smaller than the predetermined voltage. Thus, the drive signal from the signal output circuit is provided to the control circuit. In this manner, the drive signal can be supplied to the control circuit of the isolated secondary unit by driving the operation circuit of the primary unit to change the load such as the lighting pattern of the decoration lamps.

In addition, in the non-contact power supply device, the secondary winding of the coupling transformer includes a resonance circuit so that the oscillation frequency in the primary unit and a resonance frequency in the secondary unit become identical to one another. As a result, because the impedance of the secondary winding is decreased, the alternating current can easily flow in the secondary winding, thereby efficiently transferring the electric power from the primary unit to the secondary unit.

Further, in the non-contact power supply device, the primary unit includes a frequency compensation circuit for changing the oscillation frequency of the high frequency alternating current flowing through the primary unit to be different from the resonance frequency of the secondary unit when a distance between the primary unit and the secondary unit installed together is small.

Thus, when the space between the primary unit and the secondary unit is small, the frequency compensation circuit changes the oscillation frequency of the primary unit from the resonance frequency of the secondary unit. In general, when the distance between the primary winding and secondary winding of the coupling transformer is small, the coupling coefficient between the two windings will increase, thus, the output voltage of the secondary winding will rise abnormally.

However, in the power supply device of the present invention, the oscillation frequency of the primary unit is changed from the resonance frequency of the secondary unit by the frequency compensation circuit. Therefore, it is able to prevent the abnormal voltage from being generated in the output voltage in the secondary winding, which is in turn able to prevent accidents such as fire breakouts. Also, since the frequency compensation circuit is installed in the primary unit, the operation for the compensation circuit can be conducted at the primary unit.

Further, in the non-contact power supply device of the present invention, the primary unit of the coupling transformer is comprised of a first rectifying smoothing circuit for producing a direct current by rectifying and smoothing an alternating current (AC) power supply, and a drive circuit which oscillates for converting a direct current from the first rectifying smoothing circuit to the high frequency alternating current so that the high frequency alternating current flows through the primary winding. The frequency compensation circuit changes the oscillation frequency of the high frequency alternating current produced by the drive circuit to be different from the resonance frequency of the secondary unit.

According to the non-contact power supply device, the alternating current input to the primary unit is once rectified and smoothed by the first rectifying smoothing circuit and converted to a direct current. The DC current is then converted to the high frequency alternating current by the drive circuit and supplied to the primary winding. By the electromagnetic induction of the alternating current flowing through the primary winding, the alternating current is produced in the secondary winding of the secondary unit, thereby producing an alternating voltage at the secondary winding.

The oscillation frequency in the primary unit is determined by the oscillation frequency of the drive circuit. However, since the frequency compensation circuit changes the oscillation frequency of the drive circuit, the primary unit can be operated where the oscillation frequency of that primary unit is changed from the resonance frequency in the secondary unit.

In addition, the non-contact power supply device of the present invention further includes a switch for either connecting or disconnecting an alternating current (AC) power supply to the primary unit of the coupling transformer. Thus, the AC power is supplied to the primary unit when the secondary unit is properly installed with respect to the primary unit, and the AC power is suspended when the primary unit and the secondary unit are not properly installed with one another. This allows the power supply device to operate properly depending on the manner of installation of the primary and secondary units.

Further, in the non-contact power supply device, the switch disconnects the alternating current (AC) power supply to the primary unit when the primary unit and the secondary unit of the coupling transformer are directly attached together without any intervening body. Hence, when the primary unit and the secondary unit are directly facing each other with a minimum spacing therebetween, the power supplied to the primary unit will be suspended to prevent an abnormal rise in the output voltage at the secondary winding of the coupling transformer.

Further, in the non-contact power supply device, the switch disconnects the alternating current (AC) power supply to the primary unit when the primary unit and the secondary unit of the coupling transformer are not attached face-to-face to one another. Thus, when the secondary unit is removed from the premises, the power supplied to the primary unit will be suspended even if the power plug of the primary unit is connected to the commercial power supply outlet. Therefore, the power supply device is capable of suppressing the power consumption in the primary unit.

Further, in the non-contact power supply device, a side surface of each of a primary core of the primary unit and a secondary core of the secondary unit has a C-shape where end surfaces of the primary core and the secondary core are positioned face-to-face with one another. As a consequence, the electric power can be effectively supplied to the secondary unit by efficiently interlinking the magnetic flux between the primary core and the secondary core.

Further, in the non-contact power supply device, the primary unit is provided with a casing made of high conductive non-magnetic metal, which covers a primary core other than end surfaces thereof facing the secondary unit. Accordingly, the surfaces of the primary unit except for the one facing the secondary unit is covered by the casing. Normally, the magnetic flux induced in the primary core leaks through the casing in the direction where the external sides of the casing and the bases of the primary core join together.

However, since the casing is made of the high conductive non-magnetic metal, an eddy current is generated in the direction to prevent the leaked magnetic flux when the magnetic flux passes through the casing. By the eddy current generated in this manner, the magnetic flux in the opposite direction of the leaked magnetic flux is induced in the casing, which reduces the magnetic flux interlinked between the magnetic flux leaking toward outside of the casing and the primary core. Consequently, the magnetic flux induced in the primary core effectively interlinks only with the secondary core, and thus, the electric power can be effectively transferred to the secondary unit.

In the further aspect of the present invention, the non-contact power supply device includes a primary unit and a secondary unit of a coupling transformer which are separated from one another in use and transfers electric power from the primary unit to the secondary unit through electromagnetic induction in a non-contact fashion.

The non-contact power supply device is comprised of a first coupling transformer whose primary winding is formed in the primary unit and whose secondary winding is formed in the secondary unit, a second coupling transformer where one end of its primary winding is connected to one end of the secondary winding of the first coupling transformer and other end of its primary winding is connected to one end of a secondary winding, and a resonance circuit formed in the secondary unit where one end of the resonance circuit is connected to both the primary winding and the secondary winding of the second coupling transformer and the other end of the resonance circuit is connected to the other end of the secondary winding of the first coupling transformer. The high frequency alternating current is produced between the other end of the secondary winding of the second coupling transformer and the other end of the secondary winding of the first coupling transformer.

According to the non-contact power supply device of the present invention, a current it1 flowing in the primary winding of the second coupling transformer is divided into a current ic flowing through the resonance circuit and a current ic flowing through the secondary winding of the second coupling transformer, i.e., it1=ic+it2. The voltage across the resonance circuit is Vc. At this time, a counter electromotive force Vt2 will be generated in the secondary winding of the second coupling transformer by the current it2 flowing through the secondary winding of the second coupling transformer. The sum of the voltage Vc across the resonance circuit and the counter electromotive force Vt2, i.e., Vc+Vt2, becomes the output voltage of the secondary unit.

Here, when the load connected to the secondary unit increases, the current it2 flowing through the secondary winding of the second coupling transformer as well as the current it1 flowing through the primary winding of the second coupling transformer also increase. As a result, voltages Vt1 and Vt2 at the primary winding and secondary winding of the second coupling transformer increase in proportion to the turn ratio between the two windings of the second coupling transformer.

On the other hand, when the load connected to the secondary unit decreases, the current it2 flowing through the secondary winding of the second coupling transformer as well as the current it1 flowing through the primary winding of the second coupling transformer also decrease. As a result, the voltages Vt1 and Vt2 at the primary winding and the secondary winding of the second coupling transformer decrease in proportion to the turn ratio between the two windings of the second coupling transformer.

Therefore, the current it2 of the secondary winding of the second coupling transformer changes depending upon the fluctuation of the load connected to the secondary unit. This change in the current it2 changes the voltage Vt2 of the secondary winding of the second coupling transformer in a manner to suppress the increase in the voltage Vt2. Thus, since the output voltage of the secondary unit is automatically controlled in response to the fluctuation of the load connected to the secondary unit, the load can be effectively protected from being destroyed or damaged by an excessive voltage.

Further, in the non-contact power supply device, the resonance circuit includes a resonance capacitor which forms the resonance circuit in combination with the secondary winding of the first coupling transformer and the primary winding of the second coupling transformer where capacitance of the resonance capacitor is adjusted so that a resonance frequency of the resonance circuit is equal to an oscillation frequency of a high frequency alternating current flowing through the primary unit of the coupling transformer. As a result, because the impedance of the secondary winding is decreased at the resonance frequency, the current can easily flow in the secondary winding, thereby efficiently transferring the electric power from the primary unit to the secondary unit.

Further, the non-contact power supply device includes a rectifying smoothing circuit which is connected between one end of the secondary winding of the first coupling transformer and one end of the secondary winding of the second coupling transformer for producing a DC output voltage. Hence, the non-contact power supply device can be utilized as a DC power supply. In other words, it can be utilized as a DC power source for driving electric decoration at outside of the premises.

Further, the non-contact power supply device of the present invention includes an inverter circuit having two sets of parallel connected switching circuits where each switching circuit has two serially connected switching elements wherein the inverter circuit receiving the DC output voltage from the rectifying smoothing circuit, an oscillation circuit which oscillates at a predetermined frequency, and an inverter drive circuit for turning the switching elements in the inverter circuit on and off in response to an output signal of the oscillation circuit thereby producing an alternating voltage with a frequency corresponding to the predetermined frequency at an output of the inverter circuit.

According to the non-contact power supply device, the switching elements in the inverter circuit are turned on and off by the inverter drive circuit, producing an alternating voltage having a rectangular waveform at the output of the inverter circuit. Thus, the non-contact power supply device can be utilized as an AC power supply. Furthermore, by properly selecting the oscillation frequency of the oscillation circuit, an alternating voltage with a frequency equivalent to the commercial AC power supply can be generated. Thus, the non-contact power supply device can be used as a power source for various household appliances designed for the commercial AC power supply.

Further, in the non-contact power supply device of the present invention, the primary unit of the coupling transformer includes a first rectifying circuit for rectifying the AC voltage from the commercial power supply, and a drive circuit for chopper controlling the voltage output from that first rectifying circuit and flowing an alternating current of high frequency to the primary winding of the first coupling transformer.

The secondary unit of the coupling transformer includes a second rectifying circuit for rectifying an alternating voltage output between one end of the secondary winding of the first coupling transformer and one end of the secondary winding of the second coupling transformer,. a low pass filter circuit for removing high frequency components from an output voltage of the second rectifying circuit, a zero-crossing detection circuit for generating a zero-crossing detection signal when the output voltage from the low pass filter circuit becomes approximately zero.

The secondary unit further includes an inverter circuit having two sets of parallel connected switching circuits where each switching circuit has two serially connected switching elements and receiving the output voltage from the low pass filter circuit, and an inverter drive circuit for turning the switching elements in the inverter circuit on and off in response to the zero-crossing detection signal from the zero-crossing detection circuit thereby producing an alternating voltage with a frequency equal to the commercial AC power supply at an output of the inverter circuit.

According to this non-contact power supply device, the alternating voltage output from the commercial power supply is rectified by the first rectifying circuit of the primary unit, chopper controlled by the inverter drive circuit, and flown in the primary winding of the first coupling transformer as an alternating current of high frequency. As a result, a current will flow through the secondary winding of the first coupling transformer of the secondary unit, and an alternating voltage will be generated between one end of the secondary winding of the first coupling transformer and one end of the secondary winding of the second coupling transformer.

After being rectified by the second rectifying circuit, the alternating voltage is input to the inverter circuit in the condition where high frequency components are removed therefrom by the low pass filter circuit. The output voltage of the low pass filter circuit is also input to the zero-crossing detection circuit. A zero-crossing detection signal is generated from the zero-crossing detection circuit every time when the output voltage becomes approximately zero volt.

When the zero-crossing detection signal is provided, the inverter drive circuit will turn the switching elements in the inverter circuit on and off. As a consequence, an alternating voltage with a frequency equivalent to the commercial AC power supply will be generated by the inverter circuit. Therefore, the non-contact power supply device of the present invention can be used as a power supply device for various household appliances designed for the commercial AC power supply.

Further, the non-contact power supply device includes a double pulse prevention circuit between the zero-crossing detection circuit and the inverter drive circuit for producing one zero-crossing detection signal and preventing two or more zero-crossing detection signals from being generated by the zero-crossing detection circuit within a predetermined time length.

According to this non-contact power supply device, when more than two zero-crossing detection signals are generated from the zero-crossing detection circuit within a predetermined time frame, all zero-crossing signals except the first one are prevented by the double pulse prevention circuit from being transmitted to the inverter drive circuit. Thus, even when more than two zero-crossing detection signals are produced by the zero-crossing detection circuit such as caused by noise or fluctuation of voltage waveforms, on and off timings of the switching elements of the inverter circuit are not affected, achieving an alternating voltage with high stability.

DETAILED DESCRIPTION OF THE INVENTION

Figure 1:
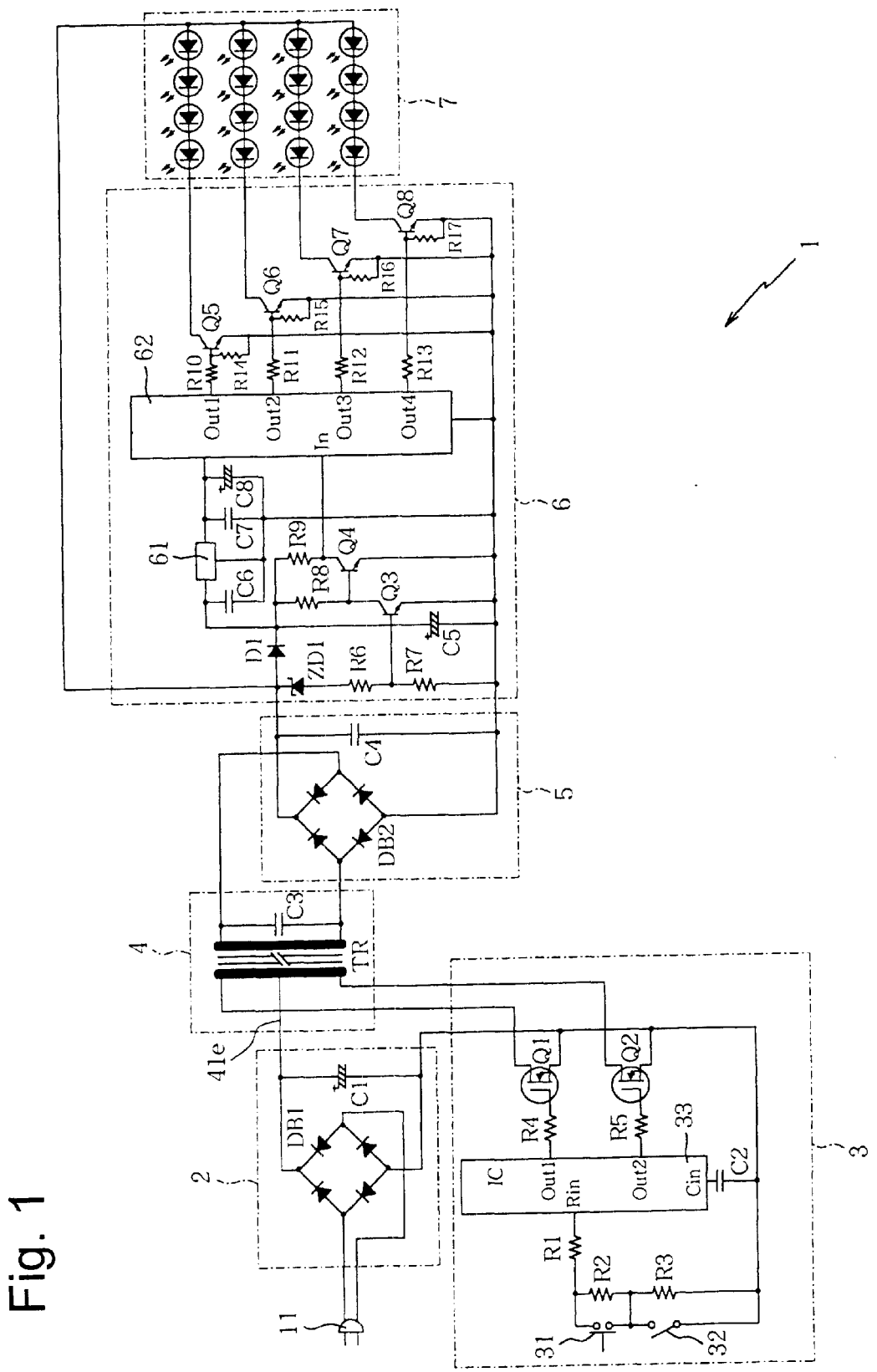
FIG. 1 is a circuit diagram showing the first embodiment of the non-contact power supply device of the present invention for electric decoration.

The details of the present invention will be explained below for the first to sixth embodiments with reference to the attached drawings. FIG. 1 is a circuit diagram of the non-contact power supply device for electric decoration of the present invention. This example shows a case where the non-contact power supply device is used for lighting the decoration lamps.

Figure 3:
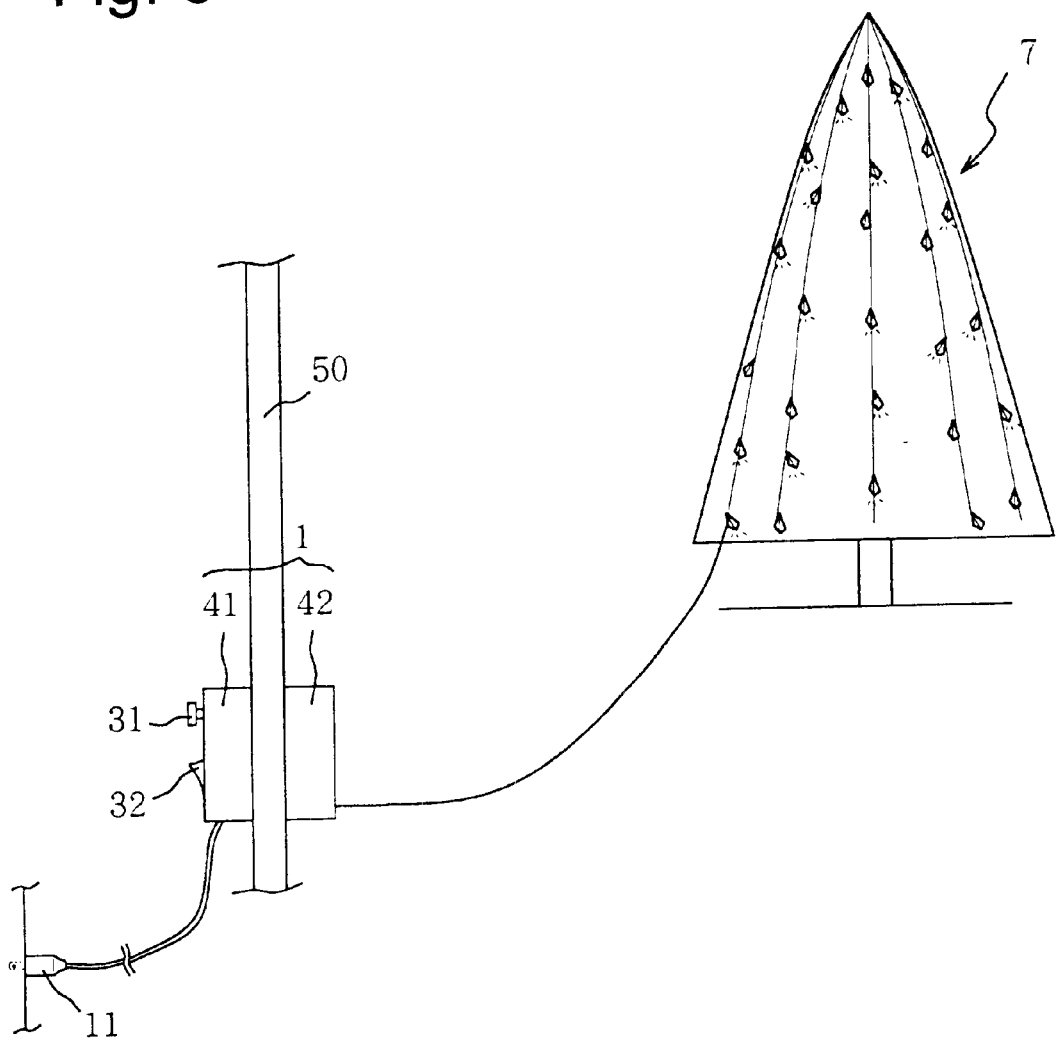
FIG. 3 is a schematic diagram showing an example of situation where the non-contact power supply device for electric decoration is used.

The non-contact power supply device 1 supplies electric power through an intervening body 50, such as a glass window or a wall, to energize electric decoration such as an LED array 7 (see FIG. 3). The non-contact power supply device 1 is mainly composed of a first rectifying smoothing circuit 2, a drive circuit 3, a coupling transformer 4, a second rectifying smoothing circuit 5, an LED drive circuit 6, and an LED array 7.

The first rectifying smoothing circuit 2 is a circuit for rectifying, smoothing and outputting the AC voltage supplied from the commercial power supply through a power plug 11 as a direct current, and is provided with a diode bridge DB1 and a smoothing capacitor C1. The positive terminal of the first rectifying smoothing circuit 2 is connected to a center tap 41e established in a primary winding 41c (FIG. 2) of a transformer TR in the coupling transformer 4. Both ends of the primary winding 41c are respectively connected to the drains of N-MOS switching devices Q1 and Q2 in the drive circuit 3.

The drive circuit 3 is a circuit for supplying an alternating current (high frequency alternating current) to the primary winding 41c of the transformer TR in the coupling transformer 4. The sources of the switching devices Q1 and Q2 in the drive circuit 3 are connected to the negative terminals of the first rectifying smoothing circuit 2. The gates of the switching devices Q1 and Q2 are respectively connected to the output terminals Out1 and Out2 of a driver IC 33 through resistors R4 and R5. The resistors R4 and R5 limit the drive current to the switching devices Q1 and Q2.

At an input terminal Cin of the driver IC 33, a capacitor C2 for timing generation is connected, and the other end of the capacitor 2 is connected to the negative terminal of the first rectifying smoothing circuit 2. Further, at an input terminal Rin of the driver IC 33, resistors R1–R3 for timing generation are serially connected. The end of the resistor R3 is connected to the negative terminal of the first rectifying smoothing circuit 2. Further, a push button switch 31 is provided in parallel with the resistor R2, and a compensation switch 32 is connected in parallel with the resistor R3.

The driver IC 33 is an IC for alternately turning the switching devices Q1 and Q2 on and off, which are connected to the output terminals Out1 and Out2. An example of such an IC is a switching regulator controller TL494 by Texas Instruments. The on/off period, i.e., an oscillation frequency of the driver IC 33 is determined by the capacitance of the capacitor C2 connected to the input terminal Cin and the resistance of the resistors R1–R3 connected to the input terminal Rin. Thus, when the push button switch 31 or the compensation switch 32 is turned on, the resistance value provided to the input terminal Rin changes, which also changes the on/off period (oscillation frequency of the driver IC 33) of the switching devices Q1 and Q2.

The push button switch 31 is a switch for changing the lighting patterns of the LED array 7, where it is structured to create an on condition only when it is pressed and to maintain an off condition when released. On the other hand, the compensation switch 32 is a switch used to prevent the output voltage of the secondary unit 42 from rising abnormally.

Such an abnormal increase in the output voltage arises when the space or distance (degree of coupling) between primary unit 41 and the secondary unit 42 in the coupling transformer 4 is small. This is a situation, for example, when the thickness of intervening body 50, such as a glass window or a wall, held between the primary unit 41 and the secondary unit 42 is thin. The compensation switch 32 is different from the push button switch 31 in that it is structured to maintain either on or off condition after the switch has been released.

Since the compensation switch 32 is to change the oscillation frequency of the driver IC 33 depending on the thickness of intervening body 50, such as a glass window or wall, between the primary unit 41 and the secondary unit 42, instead of the on/off two-way switch in the above example, a variable resistor can also be used for this purpose. Preferably, such a variable resistor is able to change the resistance value from zero ohm to several kilo ohms. If the compensation switch 32 is structured by a variable resistor, the oscillation frequency of the driver IC 33 can be fine tuned to an optimal frequency depending upon the thickness of the intervening body 50, such as a glass window or a wall between the primary unit 41 and the secondary unit 42. Thus, the power is supplied from the primary unit 41 to the secondary unit 42 in the best condition.

The coupling transformer 4 is mainly structured by a transformer TR provided with a center tap 41e in the primary winding 41c, and a resonance capacitor C3 connected in parallel with the secondary winding 42c of the transformer TR. The resonance capacitor C3 is provided for forming a resonance circuit with the inductance of the secondary winding 42c. The capacitance of the resonance capacitor C3 is selected so that a resonance frequency at the secondary winding of the coupling transformer 4 is equal to the oscillation frequency. at the primary winding of the coupling transformer 4.

In other words, the capacitance of the resonance capacitor C3 is adjusted so that the resonance frequency of the secondary winding is equal to the oscillation frequency of the driver IC 33 when both the push button switch 31 and the compensation switch 32 in the drive circuit 3 are in the off condition. Because of this arrangement, the current can easily flow into the secondary unit of the coupling transformer 4, thereby supplying a sufficient electric power from the primary unit 41 to the secondary unit 42.

Figure 2:
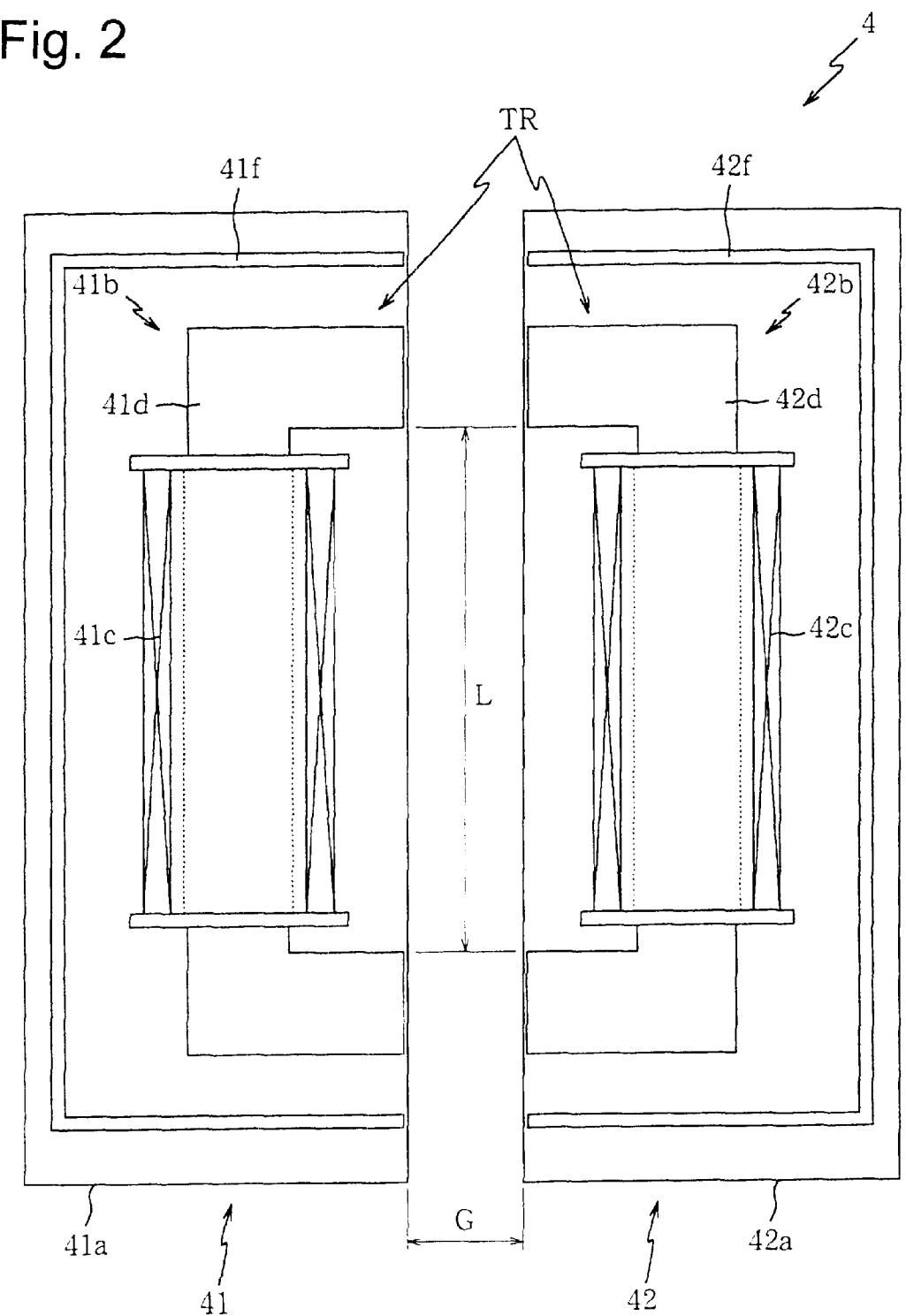
FIG. 2 is a cross sectional side view showing a structure of a coupling transformer having a primary unit and a secondary unit.

FIG. 2 is a cross sectional side view showing the basic structure in the coupling transformer 4. The illustration of the center tap 41e of primary winding 41c and the resonance capacitor C3 connected to the secondary winding 42c in parallel is omitted in FIG. 2.

As shown in FIG. 2, the coupling transformer 4 is divided into the primary unit 41 and the secondary unit 42, and are separately stored in covers 41a and 42a, respectively. The primary unit 41 includes a primary core 41b which is comprised of a primary winding 41c and a yoke 41d. The secondary unit 42 includes a secondary core 42b which is comprised of a secondary winding 42c and a yoke 42d. The side of both the primary core 41b (yoke 41d) and the secondary core 42b (yoke 42d) is formed in the shape of letter C. The primary core 41 and the secondary core 42 are so positioned that their end surfaces of the respective yokes face each other.

The yoke 41d of the primary core 41b and the yoke 42d of the secondary core 42b are formed to be sufficiently long to achieve a sufficient efficiency in supplying the power from the primary winding 41c to the secondary winding 42c through electromagnetic induction. Namely, the length L of the yokes 41d and 42d is preferably two times or more longer than a gap G between the primary unit 41 and the secondary unit 42 (L>2G). The primary core 41b and the secondary core 42b in this embodiment are structured as noted above.

The primary winding 41c is wound around the yoke 41d and the secondary winding 42c is wound around the yoke 42d. The primary core 41b and the secondary core 42b can be formed in a letter E-shape instead of the letter C-shape. Further, as noted above, the center tap 41e is formed on the primary winding 41c, and the resonance capacitor C3 is connected to the secondary winding 42c in a parallel fashion as shown in FIG. 1.

Further, the primary unit 41 has an end surface open to face the secondary unit 42, and the secondary unit 42 has an end surface open to face the primary unit 41. The primary unit 41 and the secondary unit 42 are respectively covered by box-shaped casings 41f and 42f made of high conductivity non-magnetic metal. Normally, the magnetic flux induced by the primary core 41b leaks through the casing 41f in the direction toward the outer side of the casing 41f and interlinks between the bases of the primary core 41b. However, since the casing 41f is made of high conductivity non-magnetic metal, when the magnetic flux passes through the casing 41f, an eddy current will be generated in a manner to prevent the magnetic flux.

Because of the eddy current, magnetic flux which is in the direction opposite to the leaked magnetic flux is induced, thereby reducing the magnetic flux leaking toward the outside of the casing 41f and the magnetic flux interlinked between the bases of the primary core 41b. Hence, the magnetic flux induced in the primary core 41b can be efficiently interlinked only with the secondary core 42b by the effect of the casing 41f. Thus, the electric power is effectively supplied from the primary unit 41 to the secondary unit 42.

The second rectifying smoothing circuit 5 is a circuit for rectifying and smoothing the high frequency alternating voltage from the coupling transformer 4 to produce a DC (direct current) voltage. The DC voltage is then supplied to the LED drive circuit 6. The second rectifying smoothing circuit 5 is provided with a diode bridge DB2 and a smoothing capacitor C4. Namely, the output of the coupling transformer 4 is rectified by the diode bridge DB2 and smoothed by the capacitor C4, then output to the LED drive circuit 6.

The LED drive circuit 6 is provided for controlling the lighting patterns of the LED array 7. The LED drive circuit 6 includes a voltage hold capacitor 5 for retaining the output voltage of the second rectifying smoothing circuit 5 for a predetermined time length. A cathode of a diode D1 is connected to the positive terminal of the capacitor C5 to prevent a voltage discharge from the capacitor C5. The anode of the diode D1 is connected to the positive terminal of the second rectifying smoothing circuit 5. The voltage output of the second rectifying smoothing circuit 5 is provided to the capacitor C5 through the diode D1 to charge the capacitor C5.

The positive terminal of the capacitor C5 is connected to an input terminal of a constant voltage IC 61. The output voltage of the second rectifying smoothing circuit held by the capacitor C5 is converted to a constant voltage of, for example, 5 volts by the constant voltage IC 61 and is supplied to a microcomputer 62 as a drive voltage (power supply). At the input terminal of the constant voltage IC 61, capacitors C6–C8 are provided for smoothing the transient voltage variations from the capacitor C5. The other terminals the capacitors C5–C8 are connected to the negative terminal of the second rectifying smoothing circuit 5 and the ground terminal of the constant voltage IC 61.

In addition to the anode of the diode D1, the output of the second rectifying smoothing circuit 5 is also connected to the cathode of a constant voltage (Zener) diode ZD1 of, for example, 20 volts. The anode of the constant voltage diode ZD1 is connected to one end of the resistor R6. The other end of the resistor R6 is connected to a base of an NPN transistor Q3 and to one end of the resistor R7. The emitter of the transistor Q3 is connected to the negative terminal of the second rectifying smoothing circuit 5 and the other end of the resistor R7.

The collector of the transistor Q3 is connected to a base of an NPN transistor Q4 and the resistor R8. The emitter of the transistor Q4 is connected to the negative terminal of the second rectifying smoothing circuit 5. The collector of the transistor Q4 is connected to one end of the resistor R9 and an input terminal In of the microcomputer 62. The other end of the resistor R9 is connected to the positive terminal of voltage hold capacitor C5 and the other end of the resistor R8.

The microcomputer 62 includes a CPU, a ROM (read only memory), a RAM (random access memory) and various I/O circuits configured into one chip. The ROM stores several drive pattern programs for driving each LED in the LED array 7. The output terminals Out1–Out4 of the microcomputer 62 are respectively connected to bases of NPN transistors Q5–Q8 through resistors R10–R13. The emitter of each of the transistors Q5–Q8 is connected to the negative terminal of the second rectifying smoothing circuit 5.

Further, between the base and the emitter of each of the transistors Q5–Q8, resistors R14–R17 are respectively connected. The collector of each of the transistors Q5–Q8 is connected to the cathodes of a predetermined LED row of the LED array 7. Every time a low signal is input to the input terminal In of the microcomputer 62, output signals of the microcomputer 62 change based on the drive pattern program. The output signals from the output terminals Out1–Out4 are provided to the LED array 7 through the transistors Q5–Q8, thereby changing the lighting patterns. The ground of the microcomputer 62 is connected to the negative terminal of the second rectifying smoothing circuit 5.

The LED array 7 consists of several LED rows where each LED row includes several LEDs (for example fifteen LEDs) connected in series. The cathodes of the LED rows are respectively connected to the collectors of the corresponding transistors Q5–Q8 which receive the output signals from the output terminals Out1–Out4 of the microcomputer 62. The anodes of the LED rows are commonly connected to the positive terminal of the second rectification smoothing circuit 5. The number of the LED rows and the number of LEDs in each LED row may vary depending on the size and purpose of the electric decoration. The transistors Q5–Q8, which drive the LED rows, may also vary depending on the numbers of the LEDs and the numbers of the LED rows.

Next, the operation of the non-contact power supply device for electric decoration as structured above will be explained. When the power plug is connected to the outlet of the commercial power supply (AC power supply), the direct current (DC) voltage is produced by the first rectifying smoothing circuit 2 by the effects of the diode bridge DB1 and smoothing capacitor C1. The DC voltage is produced across the smoothing condenser C1 in the first rectifying smoothing circuit 2.

At the same time, a DC voltage is supplied to the driver IC 33 in drive circuit 3 from a voltage source (not shown). The driver IC 33 generates an oscillation signal (high frequency alternating current) at a period determined by the series connected resistors R1–R3 and the capacitor C2. The oscillation signal from the output terminals Out1 and Out2 of the driver IC 33 through the resistors R4 and R5 drives the switching devices Q1 and Q2 on and off. By alternately driving the switching devices Q1 and Q2, the high frequency alternating current with a frequency defined by the capacitor C2 and the resistors R1–R3 flows through the primary winding 41c of the transformer TR in the coupling transformer 4.

When the alternating current flows through the primary winding 41c of the transformer TR of the coupling transformer 4, magnetic flux interlinks with the secondary winding 42c, thereby generating a voltage across the secondary winding 42c of the transformer TR. The capacity of the resonance capacitor C3 is adjusted so that the resonance frequency in the secondary winding 42c is identical to the frequency of the alternating current in the primary winding of the coupling transformer 4. Thus, the power is transferred to the secondary unit of the coupling transformer 4 with high efficiency.

The voltage across the resonance capacitor C3 of the coupling transformer 4 is again converted to a direct current (DC) voltage by the diode bridge DB2 and the capacitor C4 in the second rectification smoothing circuit 5 where the DC voltage is produced across the capacitor C4. The DC voltage at the capacitor C4 is supplied to the anode of the LED rows of the LED array 7 and to the constant voltage IC 61 in the LED drive circuit 6. The constant DC voltage (5 volts) suited for the microcomputer 62 is produced by the constant voltage IC 61 and supplied to the microcomputer 62 as a drive voltage (power supply).

The microcomputer 62 provided with the power supply generates drive signals for driving the LED array 7 from the output terminals Out1–Out4 based on one of the several pre-programmed LED drive patterns. In response to the drive signals, the transistors Q5–Q8 are turned on or off. As a result, the "on" transistors Q5–Q8 turn the LEDs on in the corresponding LED row, and the "off" transistors Q5–Q8 turn the LEDs off in the corresponding LED row.

The process for changing the lighting patterns of the LED array 7 in the present invention will be described. The lighting patterns of the LED array 7 can be changed every time when the push button switch 31 is pressed. The push button switch 31 is in the on condition only when the switch 31 is pressed, and maintains the off condition when it is not pressed.

More specifically, when the push button switch 31 of drive circuit 3 is pressed (turned on), the resistor R2 is shunt (short circuited), and the overall resistance value connected to the input terminal Rin of the driver IC 33 is changed. Accordingly, the oscillation frequency of driver IC 33 varies from the resonance frequency determined by the secondary winding 42c and the resonance capacitor C3 of the coupling transformer 4. As a result, the output voltage of coupling transformer 4 drops.

The oscillation frequency of the driver IC 33 determined by the resistors R1, R3 and the capacitor C2 in the condition where the push button switch 31 is on and compensation switch 32 is off is set to be sufficiently different from the resonance frequency determined by the secondary winding 42c and the resonance condenser C3 in the coupling transformer 4. Similarly, the oscillation frequency of the driver IC 33 determined by the resistor R1 and the capacitor C2 in the condition where the push button switch 31 and the compensation switch 32 are both on is set to be sufficiently different from the resonance frequency determined by the secondary winding 42c and the resonance condenser C3 in the coupling transformer 4.

Thus, when the push button switch 31 is pressed, the oscillation frequency of the driver IC 33 largely deviates from the resonance frequency determined by the secondary winding 42c and the resonance condenser C3. As a result, the output voltage of the coupling transformer 4 will drop to approximately zero volt.

When the push button switch 31 is pressed and the output of the coupling transformer 4 is zero volt as above, the constant voltage (Zener) diode ZD1 in the LED drive circuit 6 is turned off. Thus, the base current of the transistor Q3 will no longer flows, and the transistor Q3 will be turned off as well. When the transistor Q3 is turned off, the collector current flowing to transistor Q3 through the resistor R8 will now flow through the transistor Q4, making the transistor Q4 on. By turning the transistor Q4 on, the input voltage at the input terminal In of the microcomputer 62 changes from high to low. In response to this change, the LED drive pattern switches to the next lighting pattern by the microcomputer 62.

Then, when the push button switch 31 is turned off (released), the output voltage of the coupling transformer 4 returns to its original voltage. Thus, the constant voltage diode ZD1 that has been off is now turned on again, thereby flowing the base current to turn on the transistor Q3. When the transistor Q3 is turned on, the voltage at the base of the transistor Q4 drops so that the transistor Q4 is turned off, which changes the voltage at the input terminal In of the microcomputer 62 from low to high. In this manner, every time the push button switch 31 of the drive circuit 3 is pressed, the input voltage (drive signal) at the input terminal In of the microcomputer 62 drops, which changes the LED drive pattern.

In the foregoing process, when pressing the push button switch 31, the drive voltage (power supply) to the microcomputer 62 will not immediately go down even when the output voltage of the coupling transformer drops to approximately zero volt. Thus, the microcomputer 62 continuously operate when the push button switch 31 is pressed.

This is because even if the output voltage of the coupling transformer 4 becomes zero, the voltage across the voltage hold capacitor C5 of the LED drive circuit 6 will not immediately become zero volt. Therefore, the input voltage to the constant voltage IC 61 is maintained for the predetermined time length. During this time length, the drive voltage (power supply) of 5 volts from the constant voltage IC 61 is supplied to the microcomputer 62, allowing the microcomputer 62 to keep operating.

When the push button switch 31 is turned off during this time, the output voltage of coupling transformer 4 returns to its original voltage. Thus, so long as the on condition of the push button switch 31 is within the predetermined time length, the drive voltage of the power supply to the microcomputer 62 is maintained. Therefore, the operation of the microcomputer 62 continues during the on condition of the push button switch 31.

Next, the operation associated with the compensation switch 32 is described with reference to FIG. 1. The compensation switch 32 is used depending on the thickness of the intervening body 50, such as a glass window or a wall, between the primary core 41b and the secondary core 42b of the coupling transformer 4. When the thickness of the intervening body 50 between the primary core 41b and the secondary core 42b is thin, the coupling coefficient between the primary winding 41c and the secondary winding 42c of the coupling transformer 4 will increase. The increase in the coupling coefficient causes the output voltage of the secondary winding 42c increase abnormally. In such a case, in order to prevent accidents such as a fire, the compensation switch 32 of the drive circuit 3 is turned on, thereby suppressing the abnormal increase in the output voltage of the secondary winding 42c.

In operation, by turning the compensation switch 32 on, the resistor R3 is short-circuited, and the oscillation frequency of driver IC 33 becomes high. As a result, the frequency of the alternating current running through the transformer TR becomes high as well. The resonance frequency in the secondary winding 42c of the transformer TR, in combination with the resonance capacitor C3, is preset to the oscillation frequency of the driver IC 33 when resistor R3 is not short-circuited.

Thus, when the compensation switch 32 is pressed, the oscillation frequency of the driver IC 33 changes, which deviates from the resonance frequency determined by the secondary winding 42c and the resonance condenser C3 of the transformer TR. Because of the difference in the frequency between the primary winding 41c and the secondary winding 42c, the voltage of the secondary winding 42c will decrease, which cancels the abnormal voltage increase.

The compensation switch 32 used here is a switch which is turned on depending on the thickness of the intervening body 50, such as a glass window or a wall. Therefore, this switch 32 is different from the push button switch 31 which returns to the off state when it is released. The compensation switch 32 retains either the on state or the off state when the switch operation is released.

FIG. 3 is a diagram showing an example of situation where the non-contact power supply device 1 of the present invention is implemented. As shown in FIG. 3, the non-contact power supply device for electric decoration is implemented by having the primary unit 41 and the secondary unit 42 facing each other, with the intervening body 50, such as a glass window or a wall held therebetween. Typically, the primary unit 41 is established at the inside of the premises while the secondary unit 42 is established at the outside of the premises through the intervening body 50, such as a glass window, a door or a wall. The primary unit 41 and the secondary unit 42 face each other to function as the coupling transformer.

Hence, when the power plug 11 is plugged into the power outlet of the indoor commercial power supply, the electric power is supplied to the outside through the primary unit 41 to the secondary unit 42. Accordingly, the LED array 7 also located outdoor and connected to the secondary unit 42 receives the electric power and illuminates. The lighting pattern of the LED array 7 can be switched by pressing the push button switch 31 on the primary unit 41 established inside of the premises. In other words, without having to go outside, the lighting pattern of the LED array 7 can be switched by operating the switch in the inside of the premises.

Further, when the intervening body 50, such as a glass window, a door, or a wall is thin, the abnormal increase in the output voltage of the secondary unit 42 can be prevented by manipulating the compensation switch 32 in the inside of the premises. Although the non-contact power supply device of the present invention is advantageously applied to the indoor and outdoor situation noted above, the location of the primary unit 41 and the secondary unit 42 is not limited to such an indoor/outdoor situation.

Figure 5C:
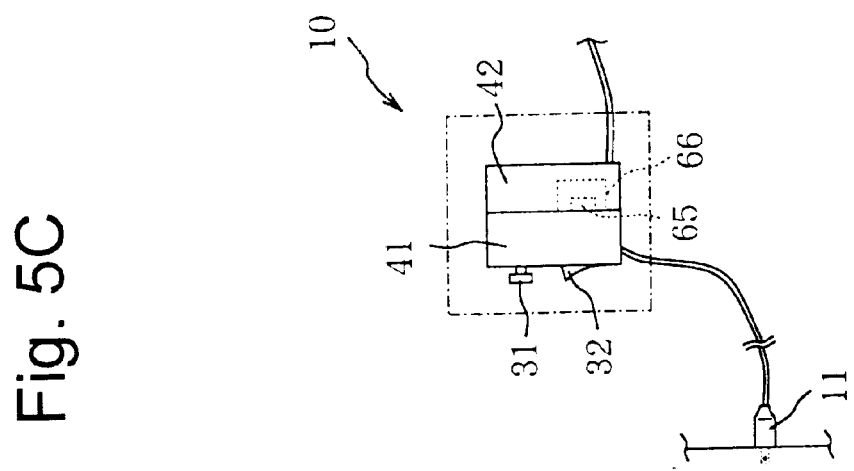
FIGS. 5A–5C are diagrams showing different situations in using the non-contact power supply device for electric decoration in the second embodiment of the present invention.
Figure 5B:
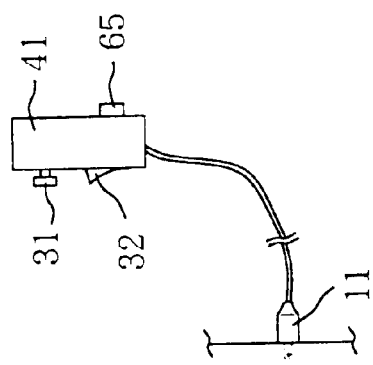
Figure 5A:
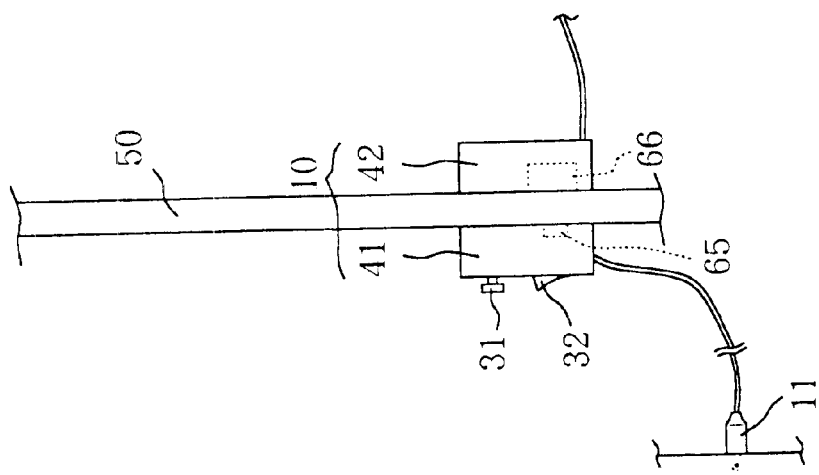
Figure 6:
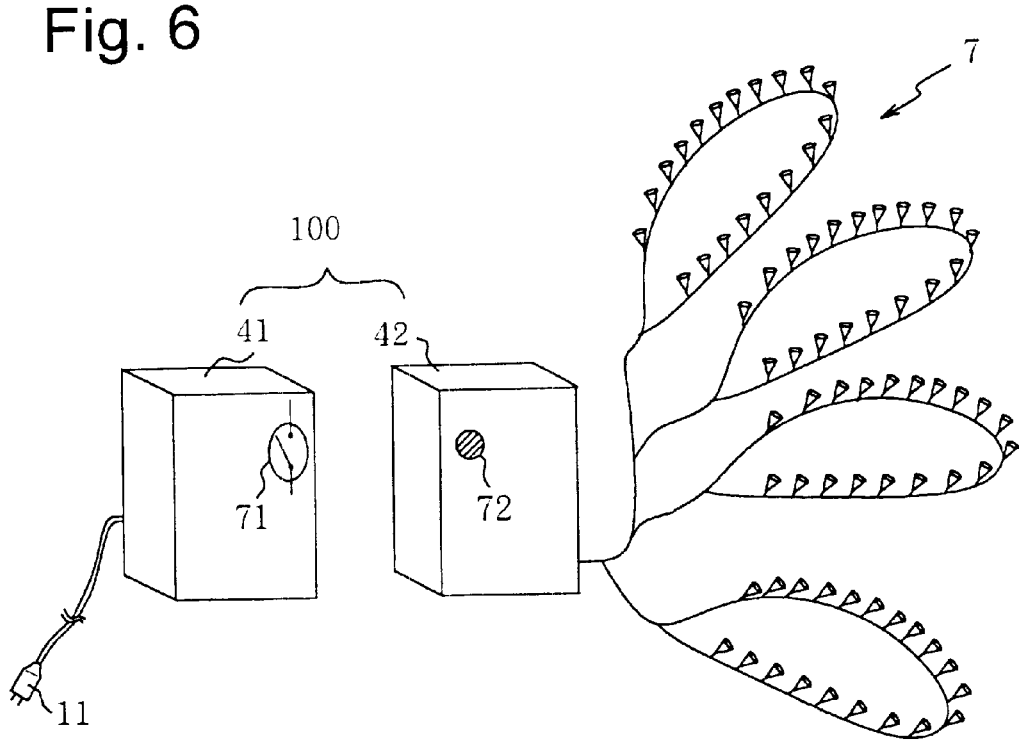
FIG. 6 is an example of appearance of the non-contact power supply device for electric decoration in the third embodiment of the present invention.

FIGS. 4–6 show second and third embodiment of the present invention. In the foregoing example, when the power plug of the primary unit 41 is connected to the commercial AC power supply, the non-contact power supply device 1 consumes the power even when the secondary unit 42 is disconnected. This is because when the power plug is connected, the drive circuit 3 is activated and generates a high frequency alternating current which flows in the primary winding 41c of the coupling transformer 4 as a standby current.

In contrast, in the second and third embodiment of the present invention, the non-contact power supply device 10 in FIG. 4 and the non-contact power supply device 100 in FIG. 6 are structured so that the power will not be consumed in the primary unit 41 when the secondary unit 42 is not coupled thereto. In the following explanation of the non-contact power supply devices 10 and 100 in the second and third embodiment, the same reference numerals are used for the same parts in the non-contact power supply device 1 in the first embodiment. Explanation will be made for the parts different from the first embodiment.

Figure 4A:
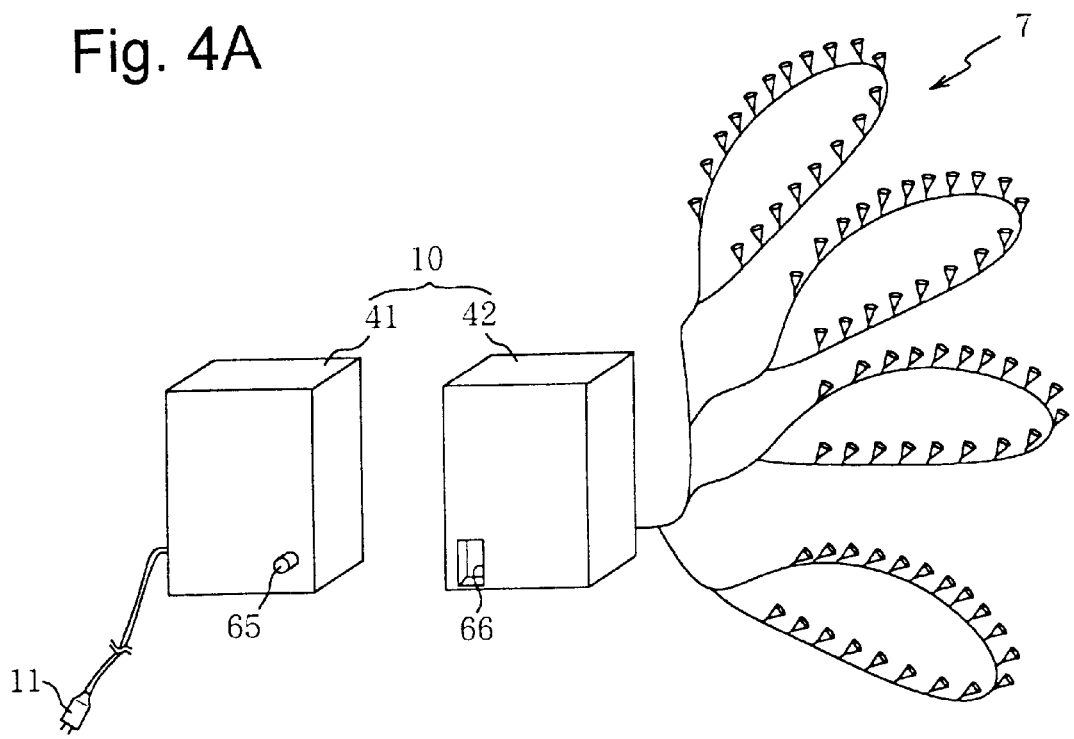
FIG. 4A is an example of appearance of the non-contact power supply device for electric decoration in the second embodiment of the present invention.

FIG. 4A is an outside view of the second embodiment of the non-contact power supply device 10 for electric decoration. In the second embodiment of the present invention, a push button switch 65 is established on the primary unit 41 on the surface that faces the secondary unit 42. Further, a depression (recess) 66 is provided on the secondary unit 42 on the surface that faces the primary unit 41. The depression 66 is larger than the push button switch 65 and is positioned to receive the push button switch 65 therein when both units 41 and 42 are coupled together. The push button switch 65 is structured to create an on condition only when pressed, and maintain an off condition when released. The depression 66 holds the push button switch 65 inside while maintaining an off condition.

Figure 4B:
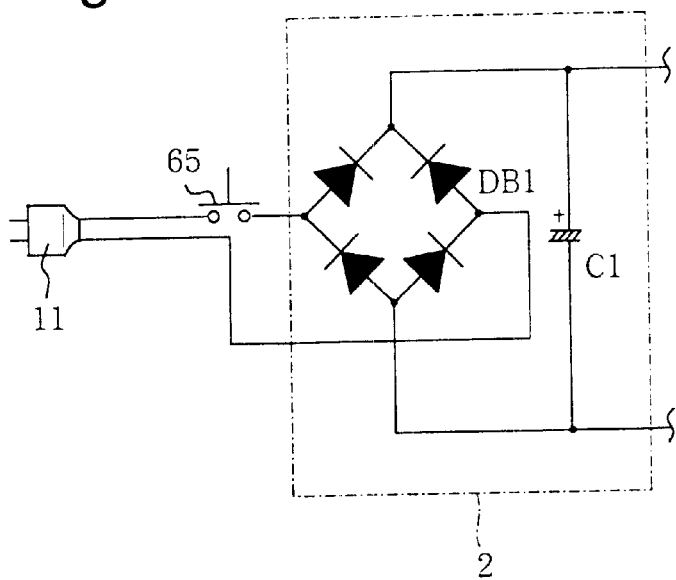
FIG. 4B is a circuit diagram of a power plug and a part of the first rectifying smoothing circuit of the non-contact power supply device for electric decoration of FIG. 4A.

FIG. 4B is a circuit diagram showing a part of the non-contact power supply device 10 of the present invention for electric decoration which includes a power plug 11 and a first rectifying smoothing circuit 2. The push button switch 65 is established between the power plug 11 and the first rectifying smoothing circuit 2. In this arrangement, the alternating voltage from the commercial power supply is supplied to the first rectifying smoothing circuit 2 and the drive circuit 3 only when the power plug 11 is inserted in the commercial power supply outlet and also the push button switch 65 is pressed. As a consequence, when the push button switch 65 is not pushed, the alternating voltage from the commercial AC power supply will not be supplied to the first rectifying smoothing circuit 2 and the drive circuit 3 even if the power plug 11 is connected to the commercial power supply outlet, resulting in no power consumption in the primary unit 41.

Therefore, as shown in FIG. 5A, when the primary unit 41 and the secondary unit 42 of the non-contact power supply device 10 of the present invention are installed normally through an intervening body 50, such as a glass window, a door or a wall, the push button switch 65 is pressed by the intervening body 50 and is turned on. Because the push button switch 65 is pressed, the alternating current power is supplied to the first rectifying smoothing circuit 2 and the drive circuit 3, allowing the primary unit 41 to operate.

On the other hand, as shown in FIG. 5B, the push button switch 65 is not pressed in the case where the primary unit 41 is removed. In that situation, the alternating voltage is not supplied to the first rectifying smoothing circuit 2 or to the drive circuit 3, resulting in no power consumption in the primary unit 41.

Further, as shown in FIG. 5C, the push button switch 65 is not pressed when the push button switch 65 is received in the depression (recess) 66. This is the case where the primary unit 41 and the secondary unit 42 are directly facing each other without the intervening body 50 such as when the non-contact power supply device is not used because, for example, of off season. Thus, the alternating power supply is not supplied to the first rectifying smoothing circuit 2 or the drive circuit 3, resulting in no power consumption in the primary unit 41.

In the first embodiment in FIGS. 1–3 described above, suppose the primary unit 41 and the secondary unit 42 are attached in the manner shown in FIG. 5C, it may invite accidents such as a fire. This is because an abnormally high voltage will be induced in the secondary unit 42 due to the extremely narrow space between the primary and secondary units. However, in the second embodiment of the non-contact power supply device 10 shown in FIGS. 4 and 5, the operation of the primary unit 41 is prohibited in such cases because the push button switch 65 is not pressed. Therefore, such an abnormally high voltage will not be induced in the secondary unit 42, preventing accidents such as fire break-out.

FIG. 6 is an example of outside appearance of the third embodiment of the non-contact power supply device 100 for electric decoration. In the third embodiment of the non-contact power supply device, a reed switch 71 is established on the surface of the primary unit 41 that faces the secondary unit 42. Further, a permanent magnet 72 is established on the surface of the secondary unit 42 that faces the primary unit 41 with an enough magnetic force to turn on the reed switch 71. The reed switch 71 is usually in the off, but is turned on only when receiving the magnetic force from the permanent magnet 72. The reed switch 71 is turned off by retreating the permanent magnet 72 from the reed switch 71.

This reed switch 71 is electrically established in the same circuit position as the push button switch 65 of the non-contact power supply device 10 for electric decoration in the second embodiment noted above. Hence, in the condition where the power plug 11 is plugged into the commercial power supply outlet, the alternating voltage is supplied to the first rectifying smoothing circuit 2 and the drive circuit 3 from the commercial power supply. Thus, in the off condition of the reed switch 71, the alternating voltage is not supplied from the commercial power supply to the first rectifying smoothing circuit 2 or the drive circuit 3, resulting in no power consumption in the primary unit 41.

As in the foregoing, in the third embodiment of the non-contact power supply device 100 for electric decoration, the electric power is supplied to the primary unit 41 only when it is positioned to face the secondary unit 42. Namely, when the primary unit 41 and the secondary unit 42 are installed normally through the intervening body 50, such as a glass window, a door, or a wall, the reed switch 71 is turned on by the magnetic force of the permanent magnet 72. Thus, the alternating voltage is supplied to the first rectifying smoothing circuit 2 and the drive circuit 3, thereby operating the primary unit 41.

However, when the secondary unit 42 is removed, the magnetic force of the permanent magnet 72 will not affect on the reed switch 71, thus the reed switch 71 remains in the off state. Hence, in this situation, the alternating voltage is not supplied to the first rectifying smoothing circuit 2 and the drive circuit 3, resulting in no power consumption in the primary unit 41.

Figure 7A:
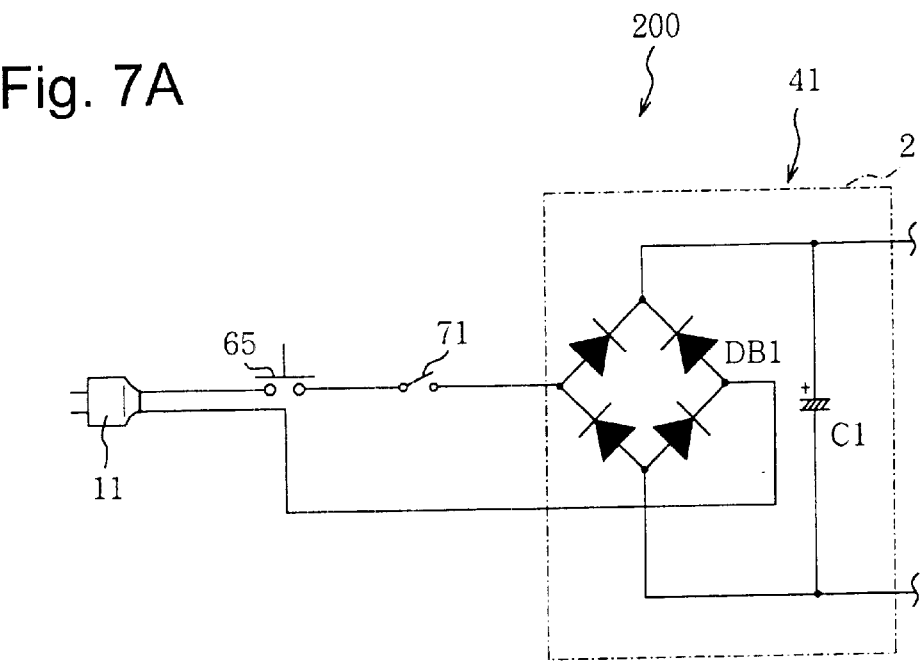
FIG. 7A is a circuit diagram of a power plug and a part of the first rectifying smoothing circuit of the non-contact power supply device for electric decoration in the fourth embodiment of the present invention.

Further, the push button switch 65 and the depression 66 in the second embodiment, as well as the reed switch 71 and the permanent magnet 72 in the third embodiment can both be installed in the non-contact power supply device of the present invention. FIG. 7A is a circuit diagram showing such an example in which a part of the non-contact power supply device 200 including a power plug 11 and the first rectifying smoothing circuit 2. The non-contact power supply device 200 for electric decoration includes both the push button switch 65 and the reed switch 71 connected in series.

Figure 7B:
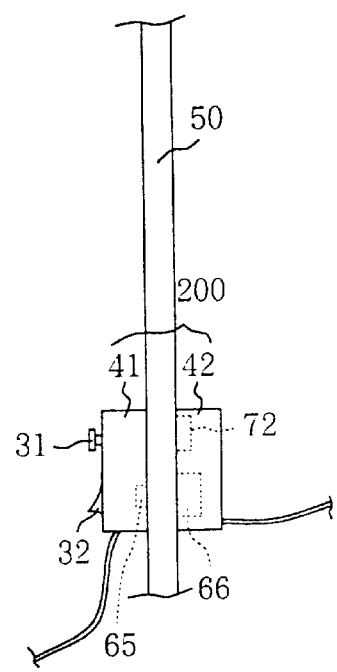
FIGS. 7B–7C are diagrams showing different situations in using the non-contact power supply device for electric decoration in the fourth embodiment.

In the non-contact power supply device 200, as shown in FIG. 7B, the primary unit 41 is turned on only when the primary unit 41 and the secondary unit 42 are mounted face-to-face each other through the intervening body 50. In this situation, the push button switch 65 is turned on by the intervening body 50 and the reed switch 71 is turned on by the magnetic force of the permanent magnet 72. As a result, the alternating voltage is supplied to the primary unit 41 to activate the non-contact power supply device 200.

Figure 7C:
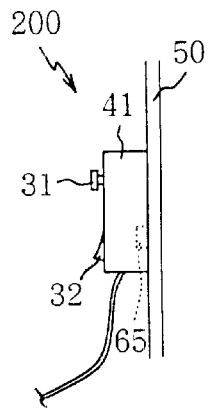

FIG. 7C shows a situation where the secondary unit 42 is removed so that only the primary unit 41 remains on the intervening body 50. In this situation, the push button switch 65 is turned on by the intervening body 50 while the reed switch 71 is turned off because no magnetic force of the permanent magnet 72 is supplied thereto. As a result, the alternating voltage is not supplied to the primary unit 41, resulting in no power consumption.

Figure 7D:
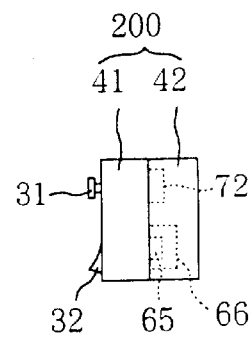

FIG. 7D shows a situation where both the primary unit 41 and the secondary unit 42 are removed from the intervening body 50 and directly attached together in the manner to face each other. In this situation, the push button 65 is turned off because it is in the hollow space of the depression 66 while the reed switch 71 is turned on because of the magnetic force of the permanent magnet 72. Since the push button switch 65 is off, the alternating voltage is not supplied to the primary unit 41, resulting in no power consumption. Further, because no power is supplied to the primary unit 41, no voltage is induced at the output of the secondary unit 42.

Figure 8:
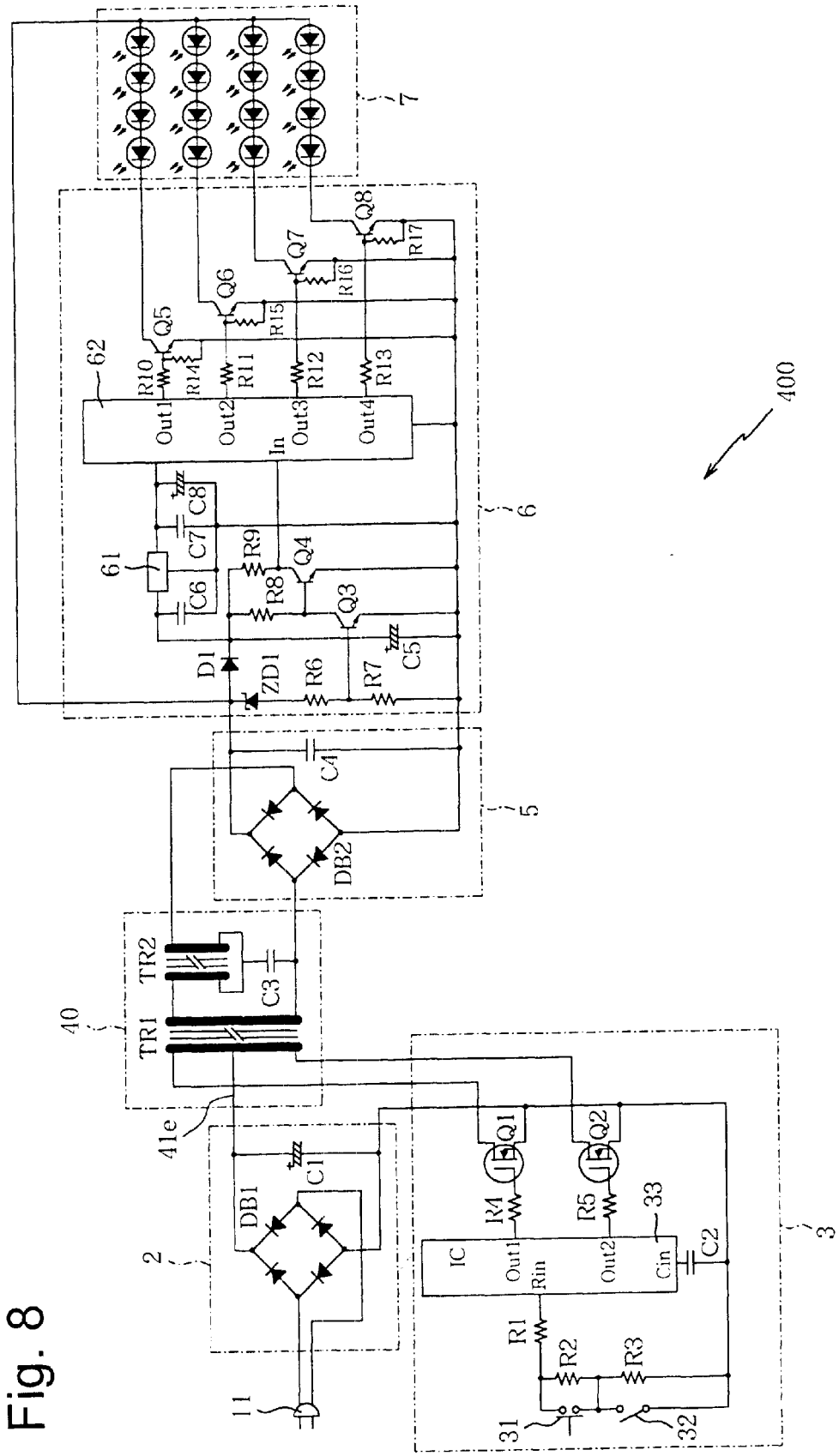
FIG. 8 is a circuit diagram of the non-contact power supply device for electric decoration in the fourth embodiment of the present invention.
Figure 9:
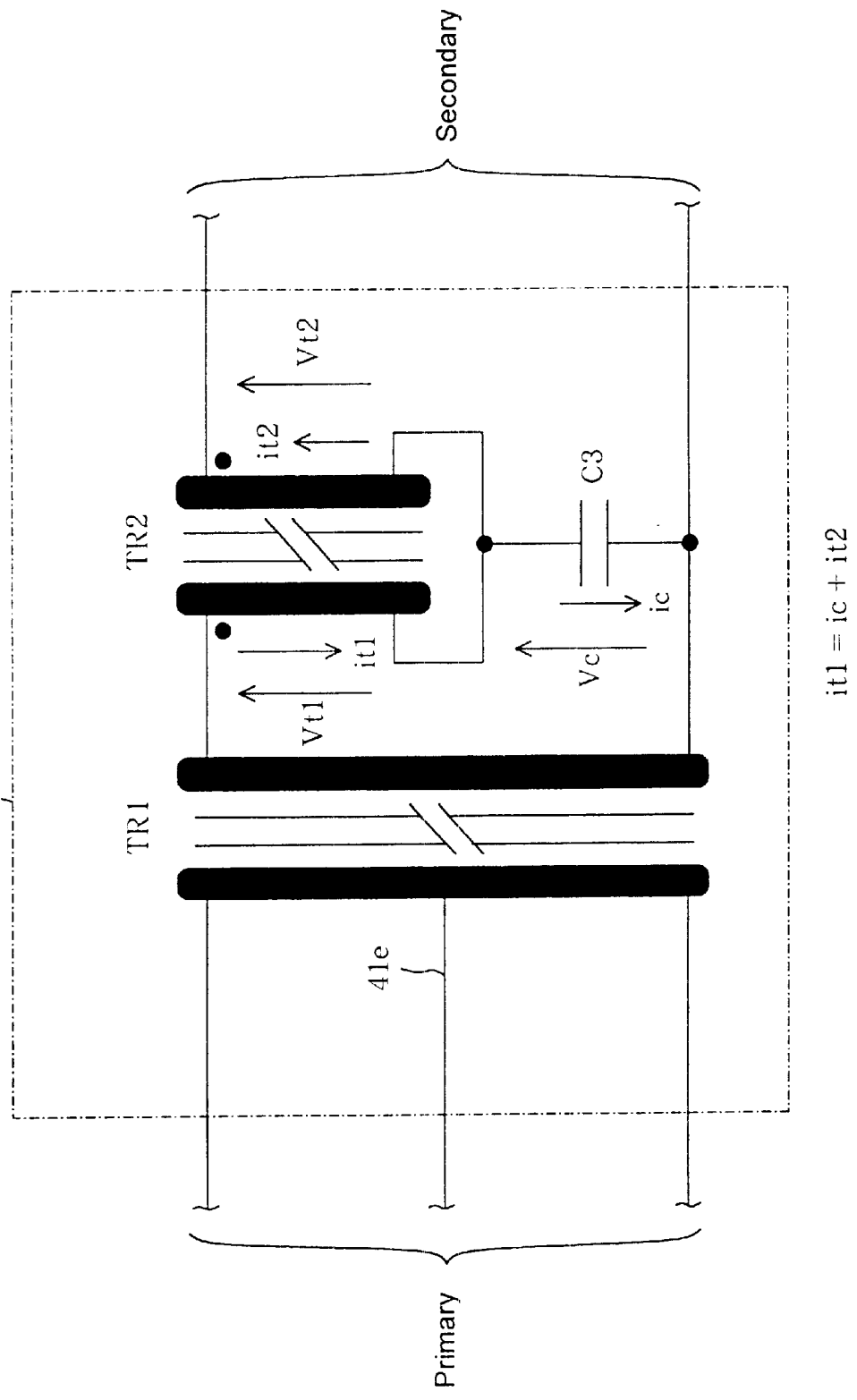
FIG. 9 is a partial circuit diagram showing an enlarged view of the coupling transformer in the fourth embodiment of the present invention.

FIGS. 8 and 9 show the fourth embodiment of the present invention. In the fourth embodiment of the non-contact power supply device 400 for electric decoration, the coupling transformer 40 is comprised of a main transformer TR1 (first coupling transformer) and a sub-transformer TR2 (second coupling transformer), and a resonance capacitor C3. The coupling transformer 40 in this embodiment is effective in preventing the output voltage of the secondary unit 42 from excessively changing regardless of the load connected to the secondary unit.

More particularly, as shown in FIG. 8, the coupling transformer 40 in the fourth embodiment is structured as follows. One end of the secondary winding 42c of the main transformer TR1 is connected to one end of a primary winding of the sub-transformer TR2. The other end of the sub-transformer TR2 is connected to the resonance capacitor C3 and one end of a secondary winding of the sub-transformer TR2. The other end of the secondary winding of the sub-transformer TR2 functions as an output terminal of the coupling transformer 40 and is connected to the input of the diode bridge DB2 of the second rectifying smoothing circuit 5. Further, as shown in FIG. 8, the other end of the secondary winding 42c of the main transformer TR1 is connected to the other end of the resonance capacitor C3 and to the other input of the diode bridge DB2 of the second rectifying smoothing circuit 5.

In other words, the coupling transformer 40 in the fourth embodiment is structured by connecting the series connected sub-transformer TR2 and resonance capacitor C3 in parallel with the secondary winding of the main transformer TR1. Also, similar to the foregoing embodiments, the non-contact power supply device for electric decoration can be separated to the primary unit 41 and the secondary unit 42 of the coupling transformer 40 to be mounted on the door, window or wall.

The resonance capacitor C3 is to establish a resonance circuit with the inductance of the secondary winding 42C of the main transformer TR1 and the primary winding of the sub-transformer TR2. The capacitance of the resonance capacitor C3 is adjusted so that the frequency of the current in the primary winding and the resonance frequency of the secondary side are identical to one another.

In other words, the capacitance of the resonance capacitor C3 is selected so that the resonance frequency becomes equal to the oscillation frequency of driver IC 33 based on the off conditions of the push button switch 31 and the compensation switch 32 in the drive circuit 3. Under this arrangement, the current from the primary winding of the coupling transformer 40 easily flows to the secondary winding, allowing sufficient power transfer to the secondary winding.

The operation of the coupling transformer 40 in the fourth embodiment will be explained with reference to FIG. 9. FIG. 9 is an enlarged view of the coupling transformer 40 in the fourth embodiment.

In this example, the current it1 flowing through the primary winding of the sub-transformer TR2 is divided into current ic flowing through the resonance capacitor C3 and current it2 flowing through the secondary winding of the sub-transformer TR2, i.e., it1=ic+it2. In this situation, a counter electromotive force Vt2 is generated across the secondary winding by the current it2 flowing through the secondary winding of the sub-transformer TR2. The sum of voltage Vc across the resonance capacitor C3 and the counter electromotive force Vt2 is an output voltage of the coupling transformer 40.

Here, when the load connected to the secondary side of the coupling transformer 40 increases, the current it2 flowing through the secondary winding of the sub-transformer TR2 as well as the current it1 flowing through the primary winding of the sub-transformer TR2 increase. As a result, voltage Vt1 across the primary winding and the voltage Vt2 across the secondary winding of the sub-transformer TR2 increase accordingly in proportion to the turn ratio (ratio of numbers of turns between the two windings) between the primary winding and the secondary winding of the sub-transformer TR2.

In contrast, when the load connected to the secondary side of the coupling transformer 40 decreases, the current it2 flowing through the secondary winding of the sub-transformer TR2 and the current it1 flowing through the primary winding of the sub-transformer TR2 decrease accordingly. As a result, the voltage Vt1 across the primary winding and the voltage Vt2 across the secondary winding, respectively, of the sub-transformer TR2 decrease in proportion to the turn ratio.

In this manner, according to the coupling transformer 40 in the fourth embodiment of the present invention, the secondary side of the main transformer TR1 is connected in parallel with the series connected sub-transformer TR2 and resonance capacitor C3. The current it2 of the secondary winding of the transformer TR2 changes in response to the changes in the load connected to the secondary side of the coupling transformer 40. The change in the current it2 is transformed into the voltage Vt2 of the secondary winding of the sub-transformer TR2.

Consequently, the output voltage of the coupling transformer 40 is automatically controlled by the change in the voltage Vt2 in the manner to reduce the voltage change caused by the load. Therefore, an excessive voltage increase at the output of the coupling transformer 40 is suppressed such as when the load is decreased, thereby protecting the load from breakdown.

Especially, when the load is not connected to the secondary side of the coupling transformer 40, the current it2 will not flow through the secondary winding of the sub-transformer TR2. Consequently, the voltage Vt2 will not be induced across the secondary winding of the sub-transformer TR2. As a result, the voltage Vc across the resonance capacitor C3 is produced as an output voltage which is not a large voltage. Thus, the sub-transformer in the fourth embodiment can prevent accidents such as a fire caused by an excessive voltage in the coupling transformer.

Figure 10:
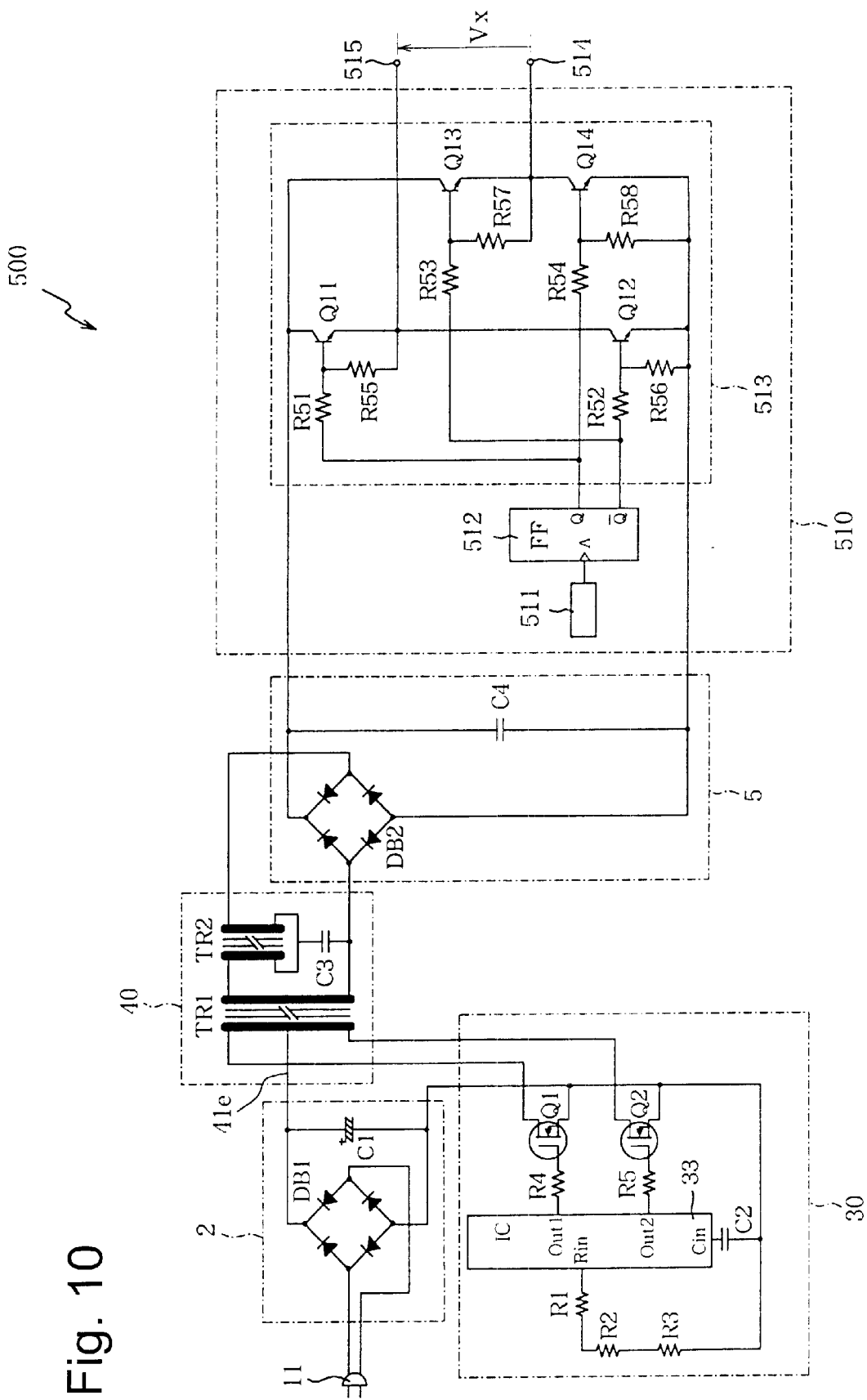
FIG. 10 is a circuit diagram showing a structure of the non-contact power supply device in the fifth embodiment of the present invention.

FIGS. 10 and 11 show the fifth embodiment of the present invention. The non-contact power supply device 500 in the fifth embodiment includes an alternating voltage output circuit 510 which is comprised of a clock generator 511, a flip-flop 512, and an inverter circuit 513. The non-contact power supply device 500 generates an alternating voltage with a frequency of ½ of the frequency of the clock 511 at the output terminals 514 and 515. In this example, the LED drive circuit 6, the LED array 7, and the push button switch 31 and the compensation switch 32 in the foregoing embodiments are not used. The non-contact power supply device 500 is useful as an outside AC power source similar to the commercial AC power supply.

As shown in FIG. 10, the alternating voltage output circuit 510 is comprised of the clock generator 511 which oscillates at twice the frequency of the commercial AC power supply, the flip flop 512 which receives the clock pulse from the clock generator 511 and inverts the Q output and Q bar output at the timing of the rising edge of the clock pulse, and the inverter circuit 513 which receives the output of the flip flop 512.

The inverter circuit 513 is mainly structured with four NPN transistors Q11–Q14. The base of the transistor Q11 is connected to the Q output of the flip flop 512 through a resistor R51 and the collector thereof is connected to the positive terminal of the second rectifying smoothing circuit 5. The emitter of the transistor Q11 is connected to the collector of the transistor Q12. The base of the transistor Q12 is connected to the Q bar output of the flip flop 512 through a resistor R52 and the emitter thereof is connected to the negative terminal of second rectifying smoothing circuit 5.

Similarly, the base of the transistor Q13 is connected to the Q bar output of the flip flop 512 through a resistor R53 and the collector thereof is connected to the positive terminal of the second rectifying smoothing circuit 5. The emitter of the transistor Q13 is connected to the collector of the transistor Q14. The base terminal of transistor Q14 is connected to Q output of flip flop 512 through a resistor R54 and the emitter thereof is connected to the negative terminal of second rectifying smoothing circuit 5. Between the base and emitter of each of the transistors Q11–Q14, resistors R55–R58 are respectively connected.

With reference to FIGS. 11A–11E, the operation of the alternating voltage output circuit 510 in the-non-contact power supply device 500 of the fifth embodiment will be explained below. FIGS. 11A–11E are timing diagrams showing output waveforms and timings at various points in the alternating voltage output circuit 510.

Figures 11A, 11B, 11C, 11D, 11E:
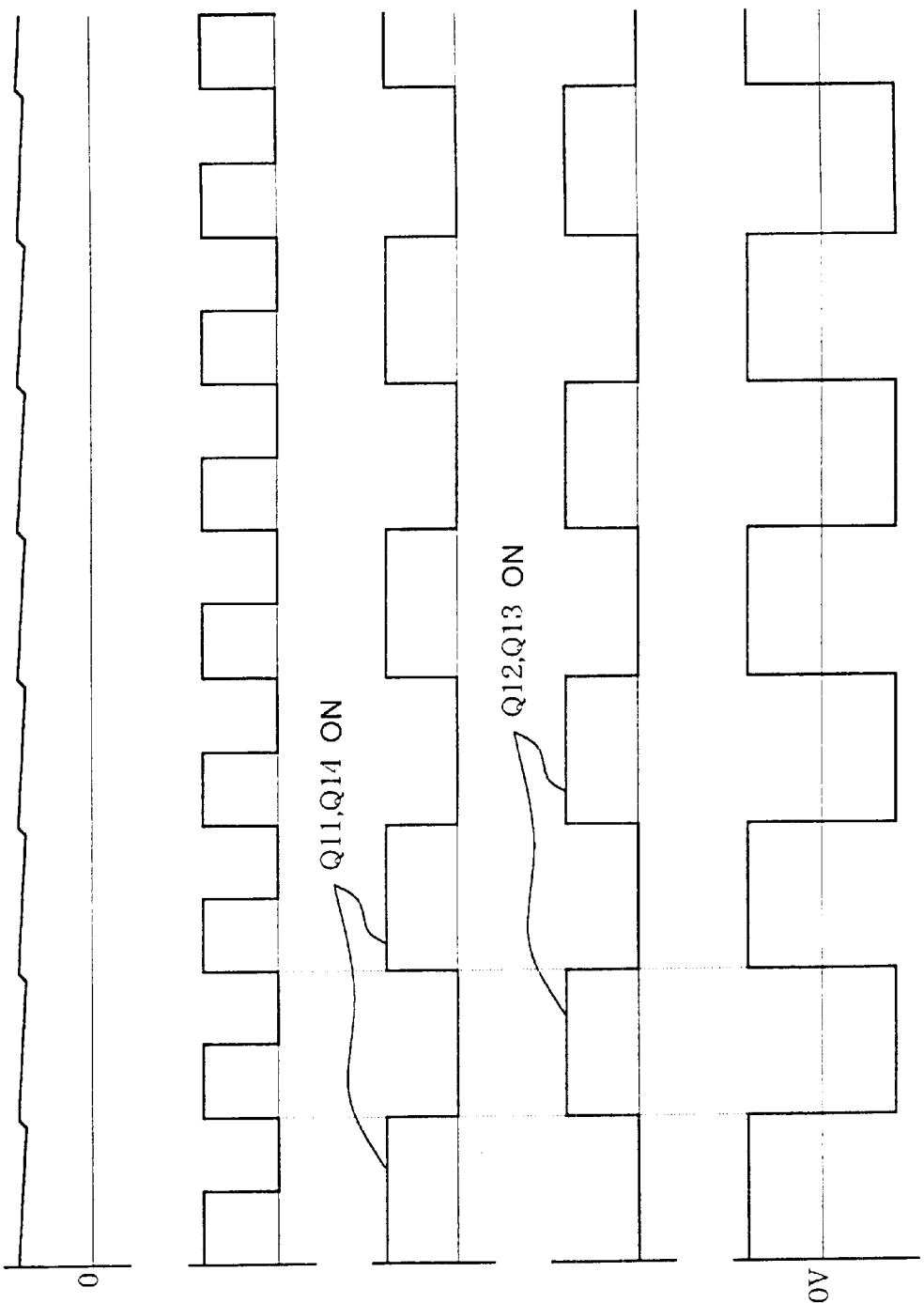
FIGS. 11A–11E are timing diagrams showing the waveforms at various points in the alternating voltage output circuit of FIG. 10.

The output of the second rectifying smoothing circuit 5 is a DC (direct current) voltage rectified by the diode bridge DB2 and smoothed by the smoothing capacitor C4. As shown in FIG. 11A, the DC voltage shows small ups and downs or ripple at the oscillation frequency of the drive circuit 30. On the other hand, the clock pulse with the oscillation frequency of twice the frequency of the commercial AC power supply is generated by the clock generator 511 as shown in FIG. 11B, which is received by the flip flop 512.

At the timings of the rising edges of the clock pulses, the flip flop 512 changes the state at the Q output as well as the Q bar output as shown in FIGS. 11C and 11D. Each of the transistors Q11–Q14 is turned either on or off at each change in the output of the flip flop 512. As a result, an alternating voltage Vx with a frequency equal to that of the commercial AC power supply is produced at the output terminals 514 and 515 as shown in FIG. 11E.

As mentioned above, according to the fifth embodiment of the non-contact power supply device 500, by using the clock generator 511 oscillating at the frequency two times higher than that of the commercial AC power supply, an alternating voltage Vx having the frequency equal to the commercial AC power supply is generated at the output. Hence, the output terminals 514 and 515 of the non-contact power supply device 500 at the outside of the premises can be used in the same manner as the indoor commercial AC power supply. Thus, various home appliances designed for the commercial AC power supply can be used outdoors without opening the door or window.

Further, since the non-contact power supply device 500 includes the sub-transformer TR2 as a second coupling transformer at the secondary side of the main transformer TR1, it can effectively prevent an excessive increase in the output voltage at the output terminals 514 and 515. Thus, the electrical appliances connected to the output terminals 514 and 515 will not be damaged or destroyed. The frequency of the commercial AC power supply may vary depending on the areas, such as east Japan and west Japan. However, by changing the oscillation frequency of the clock generator 511, the frequency of the voltage output can be adjusted, thereby achieving excellent flexibility in the non-contact power supply device 500.

Figure 12:
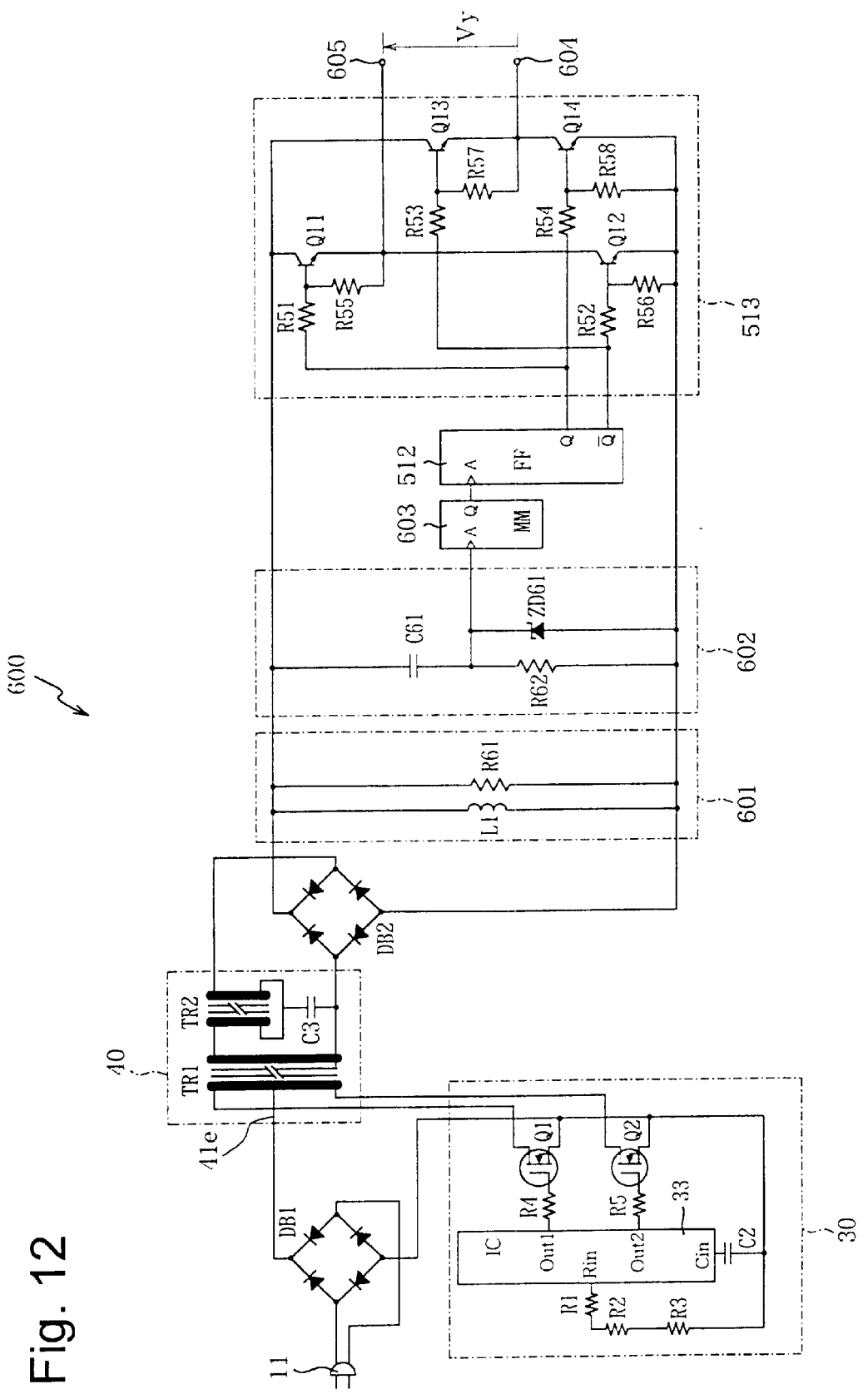
FIG. 12 is a circuit diagram showing a structure of the non-contact power supply device in the sixth embodiment of the present invention.

FIGS. 12 and 13 show the sixth embodiment of the present invention. As described above, the non-contact power supply device 500 in the fifth embodiment is a power supply device which outputs the alternating voltage with rectangular waveforms. In the sixth embodiment of the present invention, the non-contact power supply device 600 is capable of producing an alternating voltage equivalent to the commercial AC power supply in the frequency and waveform. In other words, the non-contact power supply device 600 outputs the alternating voltage with the sine waveform.

As shown in FIG. 12, unlike the fifth embodiment, the non-contact power supply device 600 in the sixth embodiment further includes a low pass filter 601, a zero-crossing detection circuit 601 and a monostable multivibrator 603. The smoothing capacitors C1 and C4 and the clock generator 511 shown in the fifth embodiment are no longer included in the sixth embodiment.

The low pass filter 601 is provided for removing the high frequency components in the output waveform of the diode bridge DB2. The low pass filter 601 is structured, for example, by an inductor L1 and a resistor R61 connected in parallel at the output of the diode bridge DB2. In the low pass filter 601, the high frequency components of the output voltage rectified by the diode bridge DB2 (FIG. 13E) are removed therefrom. Thus, a waveform of FIG. 13F is produced which is a full-wave rectification waveform of the commercial AC power supply.

At the timing when the output voltage of the low pass filter 601 (FIG. 13F) becomes zero volt (zero-crossing timing), the output voltage of the low pass filter 601 is produced alternately at the output terminals 604 and 605. Accordingly, the alternating voltage which has the same frequency and waveform as that of the commercial AC power supply received at the power plug 11 is generated by the non-contact power supply device 600.

The zero-crossing detection circuit 602 is provided to detect the timing where the output voltage of the low pass filter 601 becomes zero volt (zero-crossing timing). The zero-crossing detection circuit 602 is comprised, for example, of a capacitor C61, a resistor R62, and a constant voltage (Zener) diode ZD61. More specifically, one end of the capacitor C61 is connected to the positive output of the low pass filter 601, and the other end of the capacitor C61 is connected to one end of the resistor R62 and a cathode of the constant voltage diode ZD61. The other end of the resistor R62 and an anode of the constant voltage diode ZD61 are connected to the negative output of the low pass filter 601. The zero-crossing detection circuit 602 generates a zero-crossing detection signal (FIG. 13G) every time when the output voltage of the low pass filter 601 crosses the zero volt.

The monostable multivibrator 603 is established between the zero-crossing detection circuit 602 and the flip flop 512.

Figure 13A:
FIGS. 13A–13K are timing diagrams showing the waveforms at various points in the alternating voltage output circuit of FIG. 12.
Figure 13B:
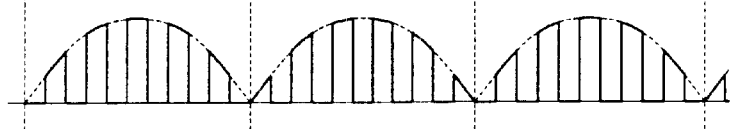
Figure 13C:
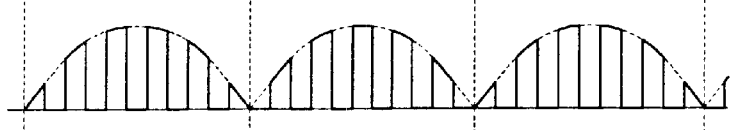
Figure 13D:
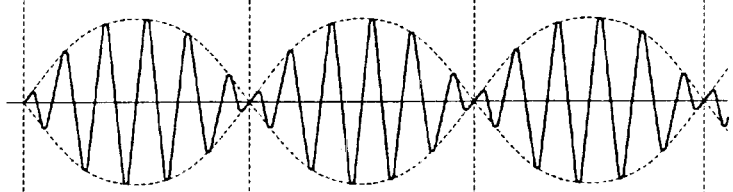
Figure 13E:
Figure 13F:
Figure 13G:
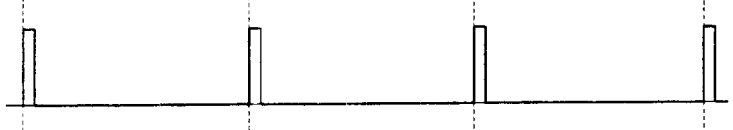
Figure 13H:
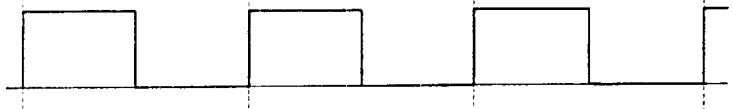
Figure 13I:
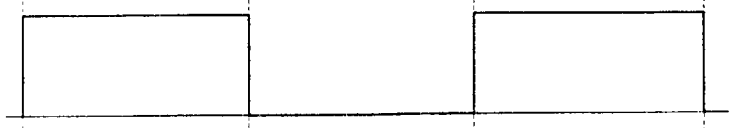
Figure 13J:
Figure 13K:
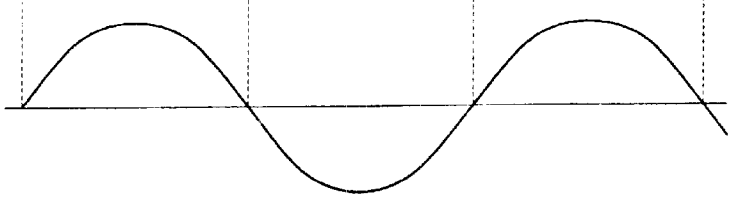

The monostable multivibrator 603 is to produce a positive pulse of a constant pulse width for the flip flop 512 at the rising timing of the detection pulse from the zero-crossing detection circuit 603 (FIG. 13H). The flip flop 512 changes the state in the Q output and the Q bar output at the timing of the rising edge of the positive pulse from the monostable multivibrator 603 (FIGS. 13I and 13J). The Q and Q bar outputs of the flip flop 512 change the output of the inverter circuit 513 (FIG. 13K).

Here, because of the fluctuations and noises on the voltage waveform at the output of the low pass filter 601, there arises a situation where two or more zero-crossing detection signal (pulses) may be generated by the zero-crossing detection circuit 602 for one zero-crossing. In the present invention, since the monostable multivibrator 603 is provided between the zero-crossing detection circuit 602 and the flip flop 512, such additional detection pulses will not affect the operation of the non-contact power supply device of the present invention.

Namely, when the two or more zero-crossing detection pulses are produced for only one zero-crossing, the monostable multivibrator 603 is triggered by the first zero-crossing detection signal. During the period of the predetermined pulse width (positive pulse of FIG. 13H), the multivibrator 603 will not respond to other input pulses. Thus, even when two or more detection signals are produced by the zero-crossing detection circuit 602, the flip flop 512 and the inverter circuit 513 are not activated by the detection signals other than the first one, thereby enabling to avoid incorrect operations of the non-contact power supply device 600.

With reference to FIGS. 13A–13K, the operation of the non-contact power supply device 600 in the sixth embodiment will be further described. FIGS. 13A–13K are timing diagrams showing waveforms and timings at various points in the non-contact power supply device 600 of the present invention.

The alternating voltage of the commercial AC power supply is supplied to the diode bridge DB1 through the power plug 11 and rectified as shown in FIG. 13A. At the same time, power supply from a direct current power supply (not shown) is supplied to the driver IC 33 in the drive circuit 30. Thus, the switching devices Q1, Q2 are alternately driven on and off (chopper control) through the resistors R4 and R5 by the period determined by the capacitor C2 and the resistors R1–R3 connected in series. The waveforms at the output of the switching devices Q1 and Q2 are shown in FIGS. 13B and 13C, respectively.

By alternately driving the switching devices Q1 and Q2 noted above, an alternating current with the frequency determined by the capacitor C2 and the resistors R1–R3 flows through the primary winding 41c of the main transformer TR1 in the coupling transformer 40. Thus, a high frequency alternating voltage shown in FIG. 13D is produced at the output of the coupling transformer 40. Since the output voltage of the diode bridge DB1 is not smoothed, an envelope of this alternating voltage looks like the voltage waveform of the commercial AC power supply.

The alternating voltage from the coupling transformer 40 shown in FIG. 13D is rectified by the diode bridge DB2 as shown in FIG. 13E. The high frequency components are removed from the low pass filter 601, thereby producing an alternating voltage which has the frequency of the commercial AC power supply with a waveform of full-wave rectification as shown in FIG. 13F. By the zero-crossing detection circuit 602, a zero-crossing detection pulse signal as shown in FIG. 13G is generated at the timing where the alternating voltage of FIG. 13F crosses the zero voltage.

At the rising timing of the zero-crossing detection signal, a positive pulse of a constant width is generated at the Q output of the monostable multivibrator 603 as shown in FIG. 13H. The positive pulse is provided to the flip flop 512, which changes the states of the Q output and the Q bar output at the timing of the rising edge of the positive pulse as shown in FIGS. 13I and 13J. The Q output and Q bar output of the flip flop 512 alternately drive the corresponding transistors Q11–Q14 either on or off. As a result, an alternating voltage Vy having the frequency and waveform identical to those of the commercial AC power supply will be produced at the output terminals 604, 605 of the non-contact power supply device 600 as shown in FIG. 13K.

As described in the foregoing, according to the sixth embodiment of the non-contact power supply device 600, the alternating voltage Vy identical to the commercial AC power supply in frequency and waveform is generated. Thus, the output terminals 604 and 605 can be used as an outdoor commercial AC power supply outlet. Consequently, by installing the non-contact power supply device 600 through a window or the like, various home appliances designed for the commercial AC power supply can be used at outside of the premises without opening the window or door.

Further, since the secondary side of the main transformer TR1 of the non-contact power supply device 600 includes a sub-transformer TR2 as a second coupling transformer, an excessive voltage increase at the output terminals 604 and 605 is effectively suppressed. Therefore, the electrical appliances connected to output terminals 604, 605 will not be damaged or broken by an excess voltage. In other words, an inside commercial power supply can be extended to be safely used at outside.

The present invention has been explained based on the preferred embodiments. However, the present invention is not limited to the specific embodiments explained above, and various modifications can be made by an ordinary person in the art within the purview of the present invention.

For example, in the foregoing embodiments, the non-contact power supply devices 1, 10, 100, 200, and 400 of the present invention have been described for the case to control the lighting of the electric decoration such as the LED array 7. However, the target of control by the non-contact power supply device of the present invention is not limited to the electric decoration, but can be properly used to control other objects as well.

In addition, in the foregoing embodiments, the push button switch 31 is established in parallel with the resistor R2 for timing generation in the drive circuit 3. By pressing the push button switch 31, the resistance value at the input terminal Rin of the driver IC 33 is changed which changes the oscillation frequency of driver IC 33. As a result of which, the voltage induced at the secondary winding 42c is reduced, resulting in switching of the lighting patterns of the LED array 7.

However, the push button switch 31 can be used in various other manner for achieving the same purpose. For example, the push button switch 31 can be connected between the center tap 41e of the primary winding 41c and the positive terminal of the capacitor C1. Alternatively, the push button switch 31 can be connected between the diode bridge DB1 and the power plug 11. By pressing the push button switch, the power supplied to the primary winding 41c is instantaneously cut off, which causes the electromagnetic induction in the secondary winding 42c cut off, resulting in switching the lighting pattern of the LED array 7.

In the fourth, fifth and sixth embodiments, a load can be directly connected to the output of the coupling transformer 40. Further, the push button switch 65 and depression (recess) 66, or the reed switch 71 and the permanent magnet 72 incorporated in the second and third embodiments, can be used in the non-contact power supply device in the fourth, fifth and sixth embodiments. Further, in the non-contact power supply device 500 in the fifth embodiment, the output voltage of the second rectifying smoothing circuit 5 shown in FIG. 10 can be used as a direct current (DC) output.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A non-contact power supply device in which a primary unit and a secondary unit of a coupling transformer are separated for use and transfers electric power from the primary unit to the secondary unit through electromagnetic induction in a non-contact fashion, wherein:
   said secondary unit of the coupling transformer comprising:
      a second rectifying smoothing circuit for rectifying and smoothing a high frequency alternating current flowing through a secondary winding based on a high frequency alternating current flowing through a primary winding of the primary unit in order to produce a DC (direct current) output voltage;
      a voltage hold circuit for maintaining the DC output voltage from the second rectifying smoothing circuit for a predetermined time length;
      a constant voltage output circuit for producing a constant voltage based on the DC output voltage from the voltage hold circuit;
      a control circuit provided with the constant voltage from the constant voltage output circuit as a power source for controlling an operation of a load connected to said secondary unit; and
      a drive signal generation circuit for supplying a drive signal to the control circuit when the output voltage from the second rectifying smoothing circuit becomes smaller than a predetermined voltage; and
   said primary unit of the coupling transformer comprising:
      an operation circuit for either stopping the high frequency alternating current flowing through the primary winding or changing the frequency of the high frequency alternating current flowing through the primary winding to decrease the DC output voltage of the second rectifying smoothing circuit smaller than said predetermined voltage for generating said drive signal by said drive signal generation circuit.

2. A non-contact power supply device as defined in claim 1, wherein said load is a set of decoration lamps and said control circuit stores a plurality of lighting patterns for the decoration lamps in a memory and changes the lighting patterns in response to said drive signal from the drive signal generation circuit.

3. A non-contact power supply device as defined in claim 1, wherein said primary unit of the coupling transformer is comprised of:
   a first rectifying smoothing circuit for producing a direct current by rectifying and smoothing an alternating current (AC) power supply, and
   a drive circuit which oscillates for converting the direct current from the first rectifying smoothing circuit to the high frequency alternating current so that the high frequency alternating current flows through the primary winding; and
   wherein said operation circuit stops the oscillation or changes the oscillation frequency in the drive circuit so as to stop the oscillation or to change the oscillation frequency of the high frequency alternating current flowing through the primary winding, thereby changing the DC output voltage of the second rectifying smoothing circuit in the secondary unit of the coupling transformer smaller than said predetermined voltage.

4. A non-contact power supply device as defined in claim 1, wherein said secondary winding in the secondary unit of the coupling transformer includes a resonance circuit so that the oscillation frequency in the primary unit and a resonance frequency in the secondary unit become identical to one another.

5. A non-contact power supply device as defined in claim 4, wherein said primary unit includes a frequency compensation circuit for changing the oscillation frequency of the high frequency alternating current flowing through the primary unit to be different from the resonance frequency of the secondary unit when a distance between the primary unit and the secondary unit installed together is small.

6. A non-contact power supply device as defined in claim 5, wherein said primary unit of the coupling transformer is comprised of:
   a first rectifying smoothing circuit for producing a direct current by rectifying and smoothing an alternating current (AC) power supply, and
   a drive circuit which oscillates for converting a direct current from the first rectifying smoothing circuit to the high frequency alternating current so that the high frequency alternating current flows through the primary winding; and
   wherein said frequency compensation circuit changes the oscillation frequency of the high frequency alternating current produced by the drive circuit to be different from the resonance frequency of the secondary unit.

7. A non-contact power supply device as defined in claim 1, further comprising a switch for either connecting or disconnecting an alternating current (AC) power supply to the primary unit of the coupling transformer.

8. A non-contact power supply device as defined in claim 7, wherein said switch disconnects the alternating current (AC) power supply to the primary unit when the primary unit and the secondary unit of the coupling transformer are directly attached together without any intervening body.

9. A non-contact power supply device as defined in claim 7, wherein said switch disconnects the alternating current (AC) power supply to the primary unit when the primary unit and the secondary unit of the coupling transformer are not attached face-to-face to one another.

10. A non-contact power supply device as defined in claim 9, wherein said switch disconnects the alternating current (AC) power supply to the primary unit when the primary unit and the secondary unit of the coupling transformer are directly attached together without any intervening body.

11. A non-contact power supply device as defined in claim 1, wherein a side surface of each of a primary core of said primary unit and a secondary core of said secondary unit has a C-shape where end surfaces of the primary core and the secondary core are positioned face-to-face with one another.

12. A non-contact power supply device as defined in claim 1, said primary unit is provided with a casing made of high conductive non-magnetic metal which covers an overall primary core other than end surfaces thereof facing the secondary unit.

13. A non-contact power supply device as defined in claim 1, wherein said coupling transformer is comprised of:
   a first coupling transformer whose primary winding is formed in the primary unit and whose secondary winding is formed in the secondary unit;
   a second coupling transformer where one end of its primary winding is connected to one end of the secondary winding of the first coupling transformer and other end of its primary winding is connected to one end of a secondary winding; and
   a resonance circuit formed in the primary where one end of the resonance circuit is connected to the primary winding and the secondary winding of the second coupling transformer and the other end of the resonance circuit is connected to the other end of the secondary winding of the first coupling transformer;
   wherein the high frequency alternating current is produced between the other end of the secondary winding of the second coupling transformer and the other end of the secondary winding of the first coupling transformer.

14. A non-contact power supply device in which a primary unit and a secondary unit of a coupling transformer are separated for use and transfers electric power from the primary unit to the secondary unit through electromagnetic induction in a non-contact fashion, comprising:
   a first coupling transformer whose primary winding is formed in the primary unit and whose secondary winding is formed in the secondary unit;
   a second coupling transformer where one end of its primary winding is connected to one end of the secondary winding of the first coupling transformer and other end of its primary winding is connected to one end of a secondary winding; and
   a resonance circuit formed in the secondary unit where one end of the resonance circuit is connected to both the primary winding and the secondary winding of the second coupling transformer and the other end of the resonance circuit is connected to the other end of the secondary winding of the first coupling transformer;
   wherein the high frequency alternating current is produced between the other end of the secondary winding of the second coupling transformer and the other end of the secondary winding of the first coupling transformer.

15. A non-contact power supply device as defined in claim 14, wherein said resonance circuit includes a resonance capacitor which forms said resonance circuit in combination with the secondary winding of the first coupling transformer and the primary winding of the second coupling transformer where capacitance of said resonance capacitor is adjusted so that a resonance frequency of the resonance circuit is equal to an oscillation frequency of a high frequency alternating current flowing through the primary unit of the coupling transformer.

16. A non-contact power supply device as defined in claim 14, further comprising a rectifying smoothing circuit which is connected between one end of the secondary winding of the first coupling transformer and one end of the secondary winding of the second coupling transformer for producing a DC output voltage.

17. A non-contact power supply device as defined in claim 16, further comprising:
   an inverter circuit having two sets of parallel connected switching circuits where each switching circuit has two serially connected switching elements, said inverter circuit receiving the DC output voltage from said rectifying smoothing circuit;
   an oscillation circuit which oscillates at a predetermined frequency; and
   an inverter drive circuit for turning the switching elements in the inverter circuit on and off in response to an output signal of the oscillation circuit thereby producing an alternating voltage with a frequency corresponding to the predetermined frequency at an output of the inverter circuit.

18. A non-contact power supply device as defined in claim 14, wherein said primary unit of said coupling transformer comprising:
   a first rectifying circuit for rectifying an AC voltage from a commercial AC power supply; and
   a drive circuit for chopper controlling an output voltage from that first rectifying circuit and flowing an alternating current of high frequency to the primary winding of the first coupling transformer;
   and said secondary unit of said coupling transformer comprising:
   a second rectifying circuit for rectifying an alternating voltage output between one end of the secondary winding of the first coupling transformer and one end of the secondary winding of the second coupling transformer;
   a low pass filter circuit for removing high frequency components from an output voltage of the second rectifying circuit;
   a zero-crossing detection circuit for generating a zero-crossing detection signal every time when the output voltage from the low pass filter circuit becomes approximately zero volt;
   an inverter circuit having two sets of parallel connected switching circuits where each switching circuit has two serially connected switching elements and receiving the output voltage from the low pass filter circuit; and
   an inverter drive circuit for turning the switching elements in the inverter circuit on and off in response to the zero-crossing detection signal from said zero-crossing detection circuit thereby producing an alternating voltage with a frequency equal to the commercial AC power supply at an output of the inverter circuit.

19. A non-contact power supply device as defined in claim 18, further comprising a double pulse prevention circuit between said zero-crossing detection circuit and said inverter drive circuit for producing one zero-crossing detection signal and preventing two or more zero-crossing detection signals from being transmitted to said inverter drive circuit within a predetermined time length.

20. A non-contact power supply device as defined in claim 14, further comprising a switch for either connecting or disconnecting an alternating current (AC) power supply to the primary unit of the coupling transformer.

21. A non-contact power supply device as defined in claim 20, wherein said switch disconnects the alternating current (AC) power supply to the primary unit when the primary unit and the secondary unit of the coupling transformer are directly attached together without any intervening body.

22. A non-contact power supply device as defined in claim 20, wherein said switch disconnects the alternating current (AC) power supply to the primary unit when the primary unit and the secondary unit of the coupling transformer are not attached face-to-face to one another.

23. A non-contact power supply device as defined in claim 22, wherein said switch disconnects the alternating current (AC) power supply to the primary unit when the primary unit and the secondary unit of the coupling transformer are directly attached together without any intervening body.

24. A non-contact power supply device as defined in claim 14, wherein a side surface of each of a primary core of said primary unit and a secondary core of said secondary unit has a C-shape where end surfaces of the primary core and the secondary core are positioned face-to-face with one another.

25. A non-contact power supply device as defined in claim 14, said primary unit is provided with a casing made of high conductive non-magnetic metal, which covers a primary core other than end surfaces thereof facing the secondary unit.

* * * * *